United States Patent
Morris et al.

(10) Patent No.: US 8,047,551 B2
(45) Date of Patent: Nov. 1, 2011

(54) MULTI-STAGE HEIGHT CONTROL VALVE INCLUDING POSITION SENSITIVE PILOT SIGNAL AND PRESSURE BOOST FOR VEHICLE AIR SPRINGS

(75) Inventors: Brian R. Morris, Uniontown, OH (US); Jesse W. Cervantez, Navarre, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 103 days.

(21) Appl. No.: 12/365,244

(22) Filed: Feb. 4, 2009

(65) Prior Publication Data
US 2009/0194179 A1    Aug. 6, 2009

Related U.S. Application Data

(60) Provisional application No. 61/025,930, filed on Feb. 4, 2008.

(51) Int. Cl.
*B60G 17/00* (2006.01)
*B60G 11/27* (2006.01)
*F16F 9/43* (2006.01)
(52) U.S. Cl. ............ 280/5.514; 280/6.159; 280/124.16; 267/64.28; 137/625.21
(58) Field of Classification Search ............... 280/5.514, 280/6.157, 6.159, 6.15, 124.16; 267/64.16, 267/64.17, 64.28, DIG. 1, DIG. 2; 137/625.21, 137/625.23
See application file for complete search history.

(56) References Cited

U.S. PATENT DOCUMENTS

| | | | | |
|---|---|---|---|---|
| 2,970,614 A | * | 2/1961 | Christensen | 137/627.5 |
| 3,006,657 A | * | 10/1961 | Augustin | 280/6.159 |
| 3,145,032 A | * | 8/1964 | Turek | 280/124.157 |
| 4,033,608 A | * | 7/1977 | Sweet et al. | 280/5.515 |
| 4,641,843 A | * | 2/1987 | Morrisroe, Jr. | 280/5.514 |
| 4,673,172 A | | 6/1987 | Blanz | |
| 5,560,591 A | | 10/1996 | Trudeau | |
| 5,630,625 A | | 5/1997 | Shaw | |
| 5,651,555 A | | 7/1997 | O'Reilly | |
| 5,934,320 A | * | 8/1999 | O'Reilly et al. | 137/625.21 |
| 6,089,551 A | | 7/2000 | Haviland | |

(Continued)

FOREIGN PATENT DOCUMENTS

DE    2318535 A1    10/1974

(Continued)

*Primary Examiner* — Ruth Ilan
*Assistant Examiner* — Keith Frisby
(74) *Attorney, Agent, or Firm* — Krugliak, Wilkins, Griffiths & Dougherty Co., L.P.A.; David P. Dureska; Brent L. Moore

(57) ABSTRACT

A multi-stage height control valve for a pneumatic control system of a vehicle includes an air reservoir port, an exhaust port, an air spring port and a pilot port operatively connected to a rotor valve which is in turn operatively connected to the vehicle. The air reservoir port fluidly communicates with an air tank. The air spring port fluidly communicates with the air springs of the vehicle. The exhaust port opens to atmosphere. The pilot port fluidly communicates with a control/warning device such that, when a secondary ride height is reached by the vehicle, the pilot port signals the control/warning device in order to maintain the vehicle at the secondary ride height. The pilot port alternatively provides an air pressure boost in order to quickly re-inflate the air springs of the vehicle to return the vehicle to the primary design ride height.

14 Claims, 10 Drawing Sheets

U.S. PATENT DOCUMENTS

| | | | |
|---|---|---|---|
| 6,202,992 B1 * | 3/2001 | O'Reilly et al. | 267/64.18 |
| 6,412,789 B1 | 7/2002 | Pierce | |
| 6,431,557 B1 | 8/2002 | Terborn | |
| 6,945,275 B2 * | 9/2005 | Krechmery et al. | 137/625.21 |
| 2007/0102895 A1 | 5/2007 | Pierce et al. | |
| 2009/0079146 A1 * | 3/2009 | Stahl et al. | 280/6.159 |
| 2009/0079154 A1 * | 3/2009 | Sheehan et al. | 280/124.16 |

FOREIGN PATENT DOCUMENTS

| | | | |
|---|---|---|---|
| EP | 1484203 A | | 12/2004 |
| GB | 2067711 A | | 7/1981 |
| JP | 10-181329 A | * | 7/1998 |
| KR | 2002045464 | * | 6/2002 |
| KR | 2007104731 | * | 10/2007 |
| WO | 2009018155 A | | 2/2009 |

* cited by examiner

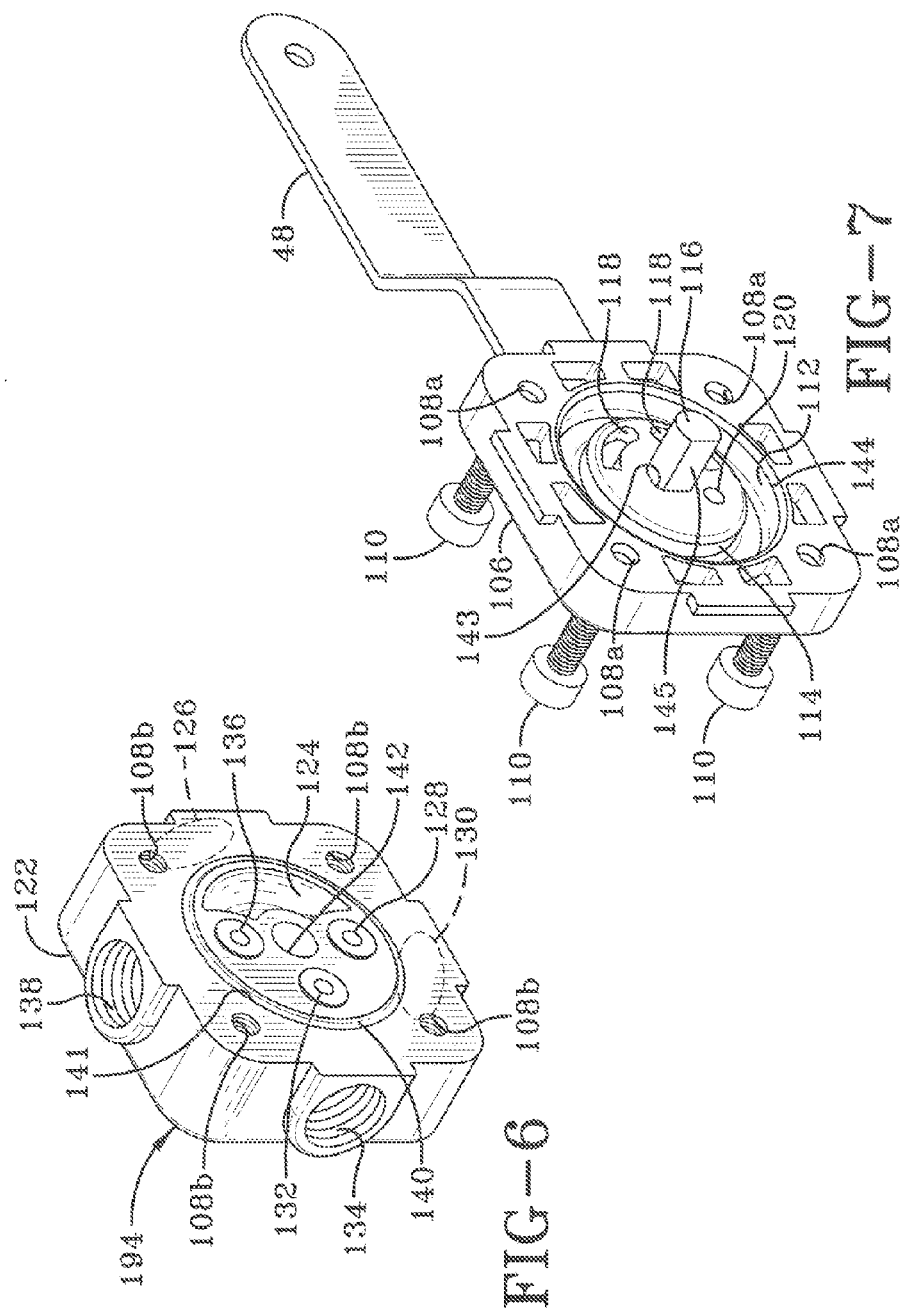

MULTI-STAGE HEIGHT CONTROL VALVE INCLUDING POSITION SENSITIVE PILOT SIGNAL AND PRESSURE BOOST FOR VEHICLE AIR SPRINGS

CROSS-REFERENCE TO RELATED APPLICATION

This application claims the benefit of U.S. Provisional Application No. 61/025,930, filed on Feb. 4, 2008.

BACKGROUND OF THE INVENTION

1. Field of the Invention

The invention relates generally to the art of air-ride axle/suspension systems for heavy-duty vehicles, such as tractor-trailers or semi-trailers, which cushion the ride and stabilize the vehicle during operation. More specifically, the invention relates to pneumatic control of the air springs of the air-ride axle/suspension systems, and in particular to a multi-stage height control valve for the air-ride axle/suspension systems which includes a position sensitive pilot signal that, for example, in one instance allows the height control valve to signal when a secondary ride height threshold has been reached to prevent further exhaustion of air from the air springs, and in another instance provides a pressure boost to relatively quickly re-inflate the air springs.

2. Description of Related Art

Heavy-duty vehicles, such as tractor-trailers or semi-trailers, typically include two or more leading or trailing arm suspension assemblies that connect the wheel bearing axles of the vehicle to the frame of the vehicle. Early suspension designs included heavy leaf-spring suspensions which resulted in a relatively rough ride to the cargo and/or passengers carried by the vehicle, and did not allow loads to equalize among the axles in all situations, thus creating the need for an axle/suspension system with softer ride characteristics and more efficient equalization characteristics. The subsequent development of air-ride axle/suspension systems provided greater load equalization among multiple axles for semi-trailers as well as improved ride quality for individual axles.

As a result, heavy-duty vehicles that transport freight often include leading or trailing arm air-ride axle/suspension systems, which use air springs to cushion the ride of the vehicle. Pneumatic control of these air springs is an important feature of air-ride axle/suspension systems. More particularly, it is important for a cushioned vehicle ride, and for optimum axle/suspension system performance and longevity to attempt to maintain a consistent predetermined distance between the vehicle frame and the travel surface. This predetermined distance is known in the art as the design ride height of the vehicle. The operating conditions of the vehicle must be considered in order to establish the design ride height of the vehicle. That is, when a heavy-duty vehicle executes certain maneuvers, such as making a hard turn or traveling over rough terrain, the forces imposed on the axle/suspension system by such maneuvers cause the axle/suspension system to articulate, or pivot and/or flex, beneath the vehicle frame which the system supports. Typically, an axle/suspension system is designed so that the anticipated range of articulation, pivoting and/or flexing occurs about a nominal predetermined position, and that nominal position is set as the design ride height of the vehicle. This articulation, pivoting and/or flexing can also be caused by the loading and unloading of the vehicle.

More specifically, after a heavy-duty vehicle is loaded with freight, or after freight is unloaded from the vehicle, the air springs of the axle/suspension system are adjusted to ensure that the vehicle is at design ride height. The adjustment of the air springs of the axle/suspension system is typically accomplished by a height control valve or leveling valve which is in fluid communication with an air source and with the air springs. When the vehicle is loaded with freight and the air springs of the axle/suspension system are compressed causing the vehicle frame to be positioned below design ride height or closer to the travel surface, compressed air is supplied to the air springs, thereby inflating/extending them and, in turn, causing the axle/suspension system to raise the vehicle frame to the design ride height. Conversely, when the vehicle is unloaded and the air springs of the axle/suspension system are extended, causing the vehicle frame to be positioned above design ride height or further away from the travel surface, air is exhausted from the air springs, thereby deflating/compressing them until the axle/suspension system lowers the vehicle frame to the design ride height. To control the flow of air into the air springs, and the exhaustion of air from the air springs, a mechanically operated valve typically is employed, and is known in the art as a height control valve or leveling valve. Adjustments to the height control valve and the linkage that controls activation of the valve enable the design ride height to be achieved before the vehicle travels over the road.

Also, as the vehicle travels over the road and the driver executes maneuvers that cause the axle/suspension system to articulate between positions that compress the air springs and positions that extend them, the height control valve acts to maintain the design ride height. That is, when the air springs are compressed, the height control valve supplies air to the air springs from a vehicle air reservoir. Conversely, when the air springs are in an extended position, the height control valve exhausts air from the springs to atmosphere. The amount of air that is supplied or exhausted is based on the duration of the articulation and the flow rate of the height control valve at a given position.

Subsequent prior art pneumatic control systems have typically included a solenoid valve which is incorporated into the pneumatic control system to allow the operator of the vehicle to dump or exhaust the air springs of the rear axle/suspension system in order to increase maneuverability of the vehicle in certain situations. Alternatively, the solenoid valve can also be incorporated in such a manner as to allow the air springs of the front and rear axle/suspension systems to be over-inflated in order to raise the height of the trailer, such as when the pneumatic control system is being used on a drop deck trailer or moving van having very low ground clearance. When configured to dump or exhaust the air springs of the rear axle/suspension system to increase maneuverability, the solenoid valve typically is in fluid communication with the conduit disposed between the height control valve and the rear air springs. In this particular configuration, the solenoid valve is utilized to exhaust the air springs of the suspension assemblies of the rear axle/suspension system when the vehicle operator encounters a situation that requires increased maneuverability of the heavy-duty vehicle, such as when the vehicle is being operated in an urban setting or when the vehicle is being maneuvered around a loading/unloading yard. More particularly, the solenoid valve is electrically connected to a control switch that is located in the cab of the heavy-duty vehicle. When the operator of the heavy-duty vehicle desires to exhaust the air springs of the rear axle/suspension system of the vehicle in order to increase maneuverability, the operator flips the control switch which sends an electrical signal or impulse to the solenoid valve. Once energized, the solenoid valve prohibits the flow of air from the height control valve to the air springs of the rear axle/suspension system and, instead, allows fluid or air in the air springs of the rear axle/suspension system to flow out through the solenoid valve to atmosphere. Typically, these prior art pneumatic control systems exhaust all of the air from the air springs of the rear axle/suspension system. By exhausting all of the air from the air springs of the rear axle/suspension system, the trailer longitudinal wheel base is effectively shortened, as the cargo loads which had previously been imparted approximately equally on both the front and rear axle/suspension systems are shifted forward toward the front axle/suspension system of the trailer.

Some problems associated with these prior art height control valves which are used in conjunction with pneumatic control systems that exhaust all of the air from the air springs of the rear axle/suspension system include difficulty on the part of the operator of the vehicle in determining when the rear axle/suspension system has become sufficiently exhausted so as to allow increased maneuverability of the vehicle. Another problem associated with such prior art valves and pneumatic control systems is relatively slow re-inflation of the air springs of the axle/suspension systems once the rear axle/suspension system dump control has been turned off. More particularly, when the operator of the vehicle desires to dump the air springs of the rear axle/suspension system to increase the maneuverability of the vehicle, the operator flips the cab switch and the solenoid valve is energized to allow air from the air springs of the rear axle/suspension system to exhaust to atmosphere. In this situation, all of the air in the air springs of the rear axle suspension system is exhausted. The prior art height control valve does not have the capability to limit or stop the exhaustion of air from the rear air springs once a sufficient lowered ride height has been reached. Moreover, when the operator of the vehicle flips the cab switch to de-energize the solenoid valve in order to once again route air from the air reservoir tank through the height control valve to the rear air springs, the pressure in the air springs of the front axle/suspension system must first drop as the pressure in the front and rear air springs reaches equilibrium. The amount of time required for the air springs of the front and rear axle/suspension systems to re-inflate can be quite lengthy because, once the solenoid valve is de-energized and the front and rear air springs reach equilibrium, the height control valve must re-inflate all of the air springs simultaneously. The result of this simultaneous re-inflation of multiple air springs is that the trailer rides on the jounce stops or bumpers or below design ride height with limited suspension travel until sufficient air pressure is built up in the air springs of the front and rear axle/suspension systems to once again allow the vehicle to achieve design ride height. As set forth above, this can take a relatively significant amount of time, the result being that the operator of the vehicle may drive for some time with the vehicle being non-air supported or below design ride height. Operating the vehicle under these conditions potentially reduces axle/suspension system performance and longevity and might also lead to undesirable wear and possible premature failure of the components of the front and rear axle/suspension systems.

For solenoid valves which are used in conjunction with pneumatic control systems for drop deck trailers or moving vans configured to over-inflate the front and rear air springs in order to raise the height of the trailer, the solenoid valve is typically in fluid communication with the conduit disposed between the height control valve and the front and rear air springs. In this configuration, the solenoid valve is utilized to over-inflate the air springs of the front and rear axle/suspension systems when the vehicle operator encounters a situation that requires higher ground clearance, such as when the vehicle encounters raised sections of the road surface at railroad tracks and/or off-road conditions. This configuration is also utilized to raise drop deck trailers equipped with a slider so that the tires mounted on the axle/suspension system(s), which in turn are mounted on the slider, are able to clear the cut-outs for the wheel wells on the trailer, so that the slider can be moved longitudinally beneath the trailer. More particularly, the solenoid valve is electrically connected to a control switch that is located in the cab of the heavy-duty vehicle. When the operator of the heavy-duty vehicle desires to over-inflate the air springs of the front and rear axle/suspension systems of the vehicle in order to increase vehicle ground clearance and raise the height of the trailer, the operator flips the control switch which sends an electrical signal or impulse to the solenoid valve. Once energized, the solenoid valve prohibits the flow of air from the height control valve to the air springs of the front and rear axle suspension systems and, instead, allows air from the vehicle air reservoir to flow directly to the air springs of the front and rear axle suspension systems, bypassing the height control valve. Typically, these prior art pneumatic control systems over-inflate the air springs of the front and rear axle/suspension systems until the shock absorbers physically stop the vehicle from being raised any further. By over-inflating the air springs of the front and rear axle/suspension systems, the trailer is raised allowing the vehicle to negotiate high sections of the road surface, such as railroad tracks and/or off road conditions, and/or also providing clearance between the tires mounted on a slider axle/suspension system and the wheel well cut-outs on the trailer so that the slider can be moved longitudinally beneath the trailer.

Some problems associated with these prior art height control valves which are used in conjunction with pneumatic control systems that over-inflate the air springs of the front and rear axle/suspension systems include potential damage to the shocks and shock mounts as they are not designed to react the full force exerted on them by the front and rear air springs during over-inflation. Moreover, the air springs themselves can also be potentially damaged during the over-inflation because the air springs are not designed to be at high inflation pressures when fully extended. A regulator could be utilized by the operator of the vehicle to control how much pressure is introduced into the air springs during over-inflation, but this operation is dependent upon the operator of the vehicle and can still lead to over-stressing the shocks, shock brackets and/or air springs.

Therefore, a need exists in the art for a height control valve for the air springs of an air-ride axle/suspension system of a heavy-duty vehicle, which overcomes the deficiencies of the prior art height control valves which are used in conjunction with pneumatic control systems and which is capable of signaling, via a pilot port, when a secondary ride height has been reached by the vehicle in order to stop additional exhaustion of air from the air springs of the rear axle/suspension system during a rear axle dump, or alternatively, to stop excessive over-inflation of the front and rear air springs during an over-inflation event, and which is also capable of providing a pressure boost to re-inflate the air springs of the air-ride axle/suspension system configured for rear axle dump in order to quickly raise the vehicle back to the design ride height.

BRIEF SUMMARY OF THE INVENTION

The objectives of the present invention include providing a multi-stage height control valve that is capable of signaling when a secondary ride height has been achieved by the vehicle.

Another objective of the present invention is to provide a multi-stage height control valve for use in conjunction with a pneumatic control system that controls exhaustion of the air springs when a secondary ride height has been achieved by the vehicle, during a rear axle dump event.

Yet another objective of the present invention is to provide a multi-stage height control valve for use in conjunction with a pneumatic control system that provides a pressure boost in order to quickly re-inflate the air springs of the vehicle in order achieve the primary design ride height of the vehicle following a rear axle dump event.

Still another objective of the present invention is to provide a multi-stage height control valve for use in conjunction with a pneumatic control system that controls inflation of the air springs when a secondary ride height has been achieved by the vehicle, during an over-inflation event.

A further objective of the present invention is to provide a multi-stage height control valve that potentially increases axle/suspension system performance and longevity.

Yet a further objective of the present invention is to provide a multi-stage height control valve that potentially reduces undesirable wear and possible premature failure of the components of the axle/suspension system.

These objectives and improvements are provided by the multi-stage height control valve for a pneumatic control system of a vehicle, the height control valve being mounted on the vehicle and which includes: an air reservoir port in fluid communication with a compressed air source; an air spring port in fluid communication with at least one air spring of the vehicle; an exhaust port in fluid communication with atmosphere; a pilot port in fluid communication with a control/warning device; and a flow control means in fluid communication with the air reservoir port, the air spring port, the exhaust port and the pilot port, the flow control means being operatively attached to the vehicle for regulating fluid flow through the air reservoir port, the air spring port, the exhaust port, and the pilot port during operation of the vehicle, whereby the height control valve alternatively prevents or signals excessive dumping or overinflation of the air spring when a secondary ride height has been reached.

BRIEF DESCRIPTION OF THE SEVERAL VIEWS OF THE DRAWINGS

Exemplary embodiments of the present invention, illustrative of the best modes in which applicants have contemplated applying the principles, are set forth in the following description and are shown in the drawings.

FIG. 6 is a perspective view of the valve body second half of the rotor valve of the first embodiment multi-stage height control valve for vehicle air springs of the present invention;

FIG. 7 is a perspective view of the valve body first half of the rotor valve of the first embodiment multi-stage height control valve for vehicle air springs of the present invention;

Similar numerals refer to similar parts throughout the drawings.

DETAILED DESCRIPTION OF THE INVENTION

Figure 1:
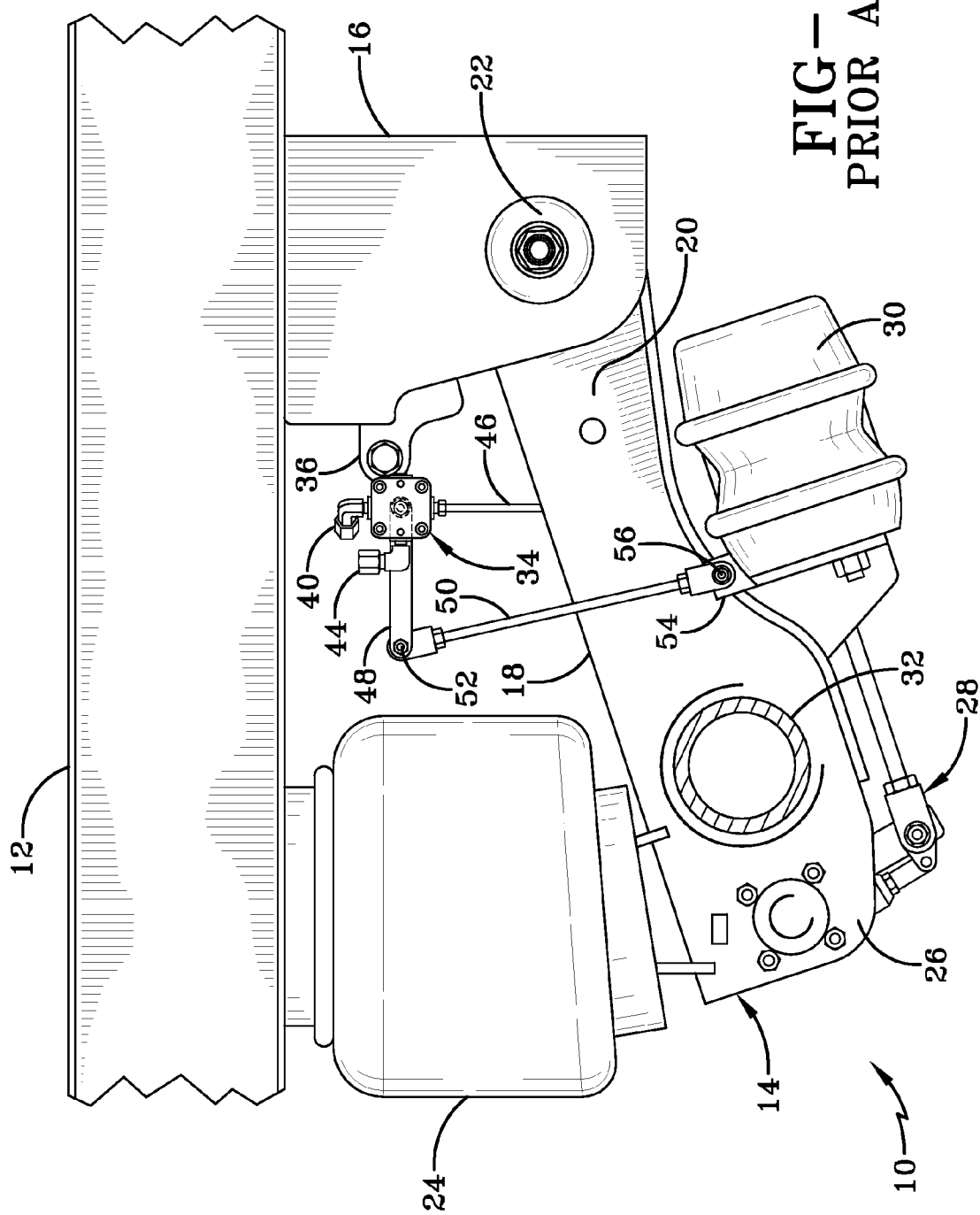
FIG. 1 is a fragmentary elevational view, with portions in section, of one of the suspension assemblies and an axle of an air-ride trailing arm beam-type axle/suspension system, shown depending from a heavy-duty vehicle frame, and further showing a prior art height control valve.

So that the structure, operation and advantages of the multi-stage height control valve for vehicle air springs of air-ride axle/suspension systems of a heavy-duty vehicle can be best understood, a typical prior art height control valve is shown in FIG. 1 and will now be described in the environment in which it is utilized. It is important to note that an air-ride axle/suspension system 10, while shown as a beam-type trailing arm axle/suspension system, also includes other types of heavy-duty vehicle air-ride axle/suspension systems known to those skilled in the art, such as leading arm beam-type air-ride axle/suspension systems and air-ride axle/suspension systems having arms other than beam-type. It is also important to note that a vehicle frame 12 is generally representative of various types of frames commonly used for heavy-duty vehicles, including primary frames that do not support a subframe, primary frames and/or floor structures that do support a subframe, and subframes themselves. For primary frames and/or floor structures that do support a subframe, the subframe can be non-movable or movable, the latter being commonly referred to as a slider box.

With continued reference to FIG. 1, axle/suspension system 10 includes a pair of generally identical suspension assemblies 14 (only one shown), each suspended from a respective one of a pair of transversely spaced frame hangers 16 (only one shown). Each hanger 16 is secured to and depends from frame 12 of the heavy-duty vehicle. Inasmuch as suspension assemblies 14 are identical to one another, only one will be described hereinbelow and shown in FIG. 1. Suspension assembly 14 includes a trailing arm type suspension beam 18 which is pivotally mounted at its front end 20 on hanger 16 in a usual manner through the use of a suitable pivot and bushing assembly 22. An air spring 24 is suitably mounted on and extends between the upper surface of a rear end 26 of suspension beam 18 and frame 12. A shock absorber (not shown) also typically is mounted on and extends between beam 18 and frame 12. A brake chamber 30 and other components of a brake system 28 are shown attached to beam 18 by way of example, as it is to be understood that other arrangements for attaching components of the brake system to an axle/suspension system 10 are known in the art. An axle 32 extends between and is captured in the pair of suspension beams 18, and one or more wheels (not shown) are mounted on each end of the axle.

Figure 2:
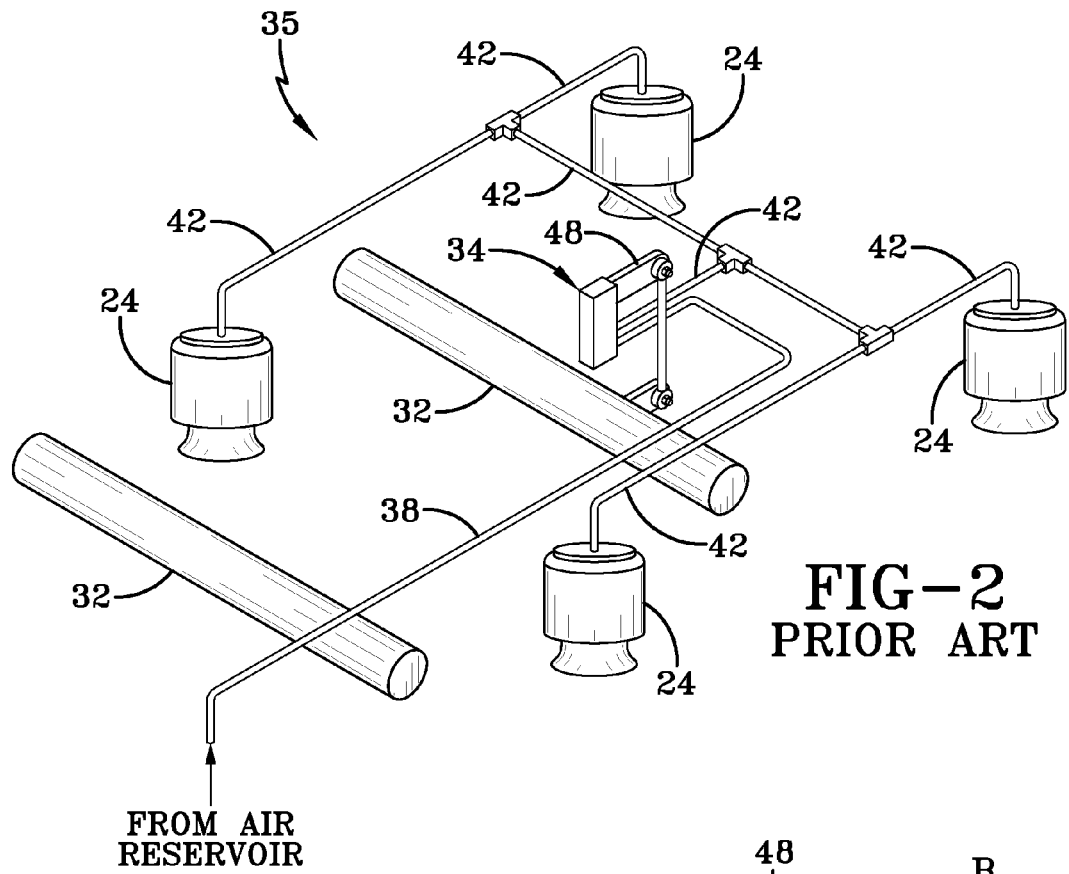
FIG. 2 is a schematic representation of a typical pneumatic control system incorporating the prior art height control valve of FIG. 1, and showing relative positions of the air springs and axles of a pair of air-ride axle/suspension systems.
Figure 3:
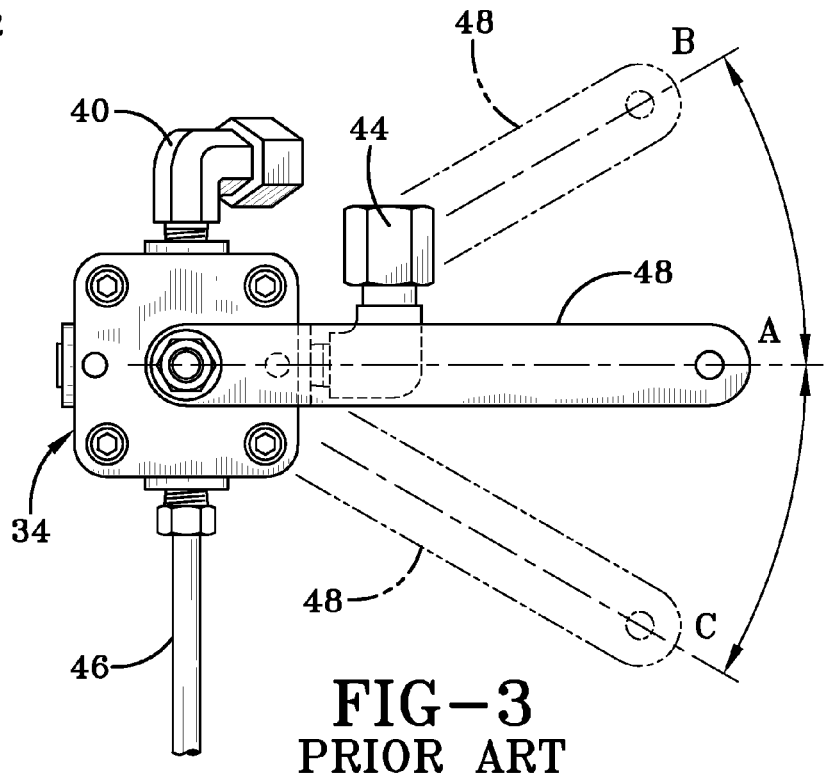
FIG. 3 is an enlarged elevational view of the prior art height control valve of FIG. 1, with the range of various valve control arm positions represented by broken lines and arrows.

A typical prior art pneumatic control system, which utilizes a height control valve 34 such as the one shown in FIGS. 1 and 3, is shown in FIG. 2, is indicated generally at 35, and will be described below. Prior art height control valve 34 (FIG. 1) is shown mounted on hanger 16 via a bracket 36 and a secondary spacer (not shown). Pneumatic control system 35 includes an air reservoir conduit 38 which is in fluid communication with height control valve 34 via an air reservoir fitting 40 (FIG. 3), and provides compressed air to the height control valve from an air reservoir (not shown), such as an air tank, as known to those skilled in the art. With continuing reference to FIGS. 2 and 3, an air spring conduit 42 is in fluid communication with height control valve 34 via an air spring fitting 44, and the air spring conduit branches off to each of a pair of front and rear air springs 24F,R, to enable the height control valve to route compressed air to and from the front and rear air springs based on certain operational conditions, as will be described below. An exhaust conduit 46 (FIG. 3) is in fluid communication with and extends from height control valve 34, enabling the height control valve to exhaust compressed air to atmosphere, as will also be described in detail below. It is to be understood that additional pneumatic and/or electronic components (not shown) that are known and used in the art, such as electronic controllers, valves, vents, and pneumatic lines, may be used in conjunction with conduits 38, 42, 46 and/or height control valve 34.

Referring now to FIGS. 1 and 3, height control valve 34 preferably is a three-way valve that includes a control arm 48, wherein the position of the control arm controls the operation of the height control valve. More particularly, when control arm 48 is in a horizontal or neutral position A, height control valve 34 is closed and does not route compressed air from air reservoir conduit 38 (FIG. 2) to air springs 24 via air spring conduits 42, nor does it exhaust air from the air springs to atmosphere via exhaust conduit 46. When control arm 48 is in a fill position range B, height control valve 34 routes compressed air from air reservoir conduit 38 to air spring conduits 42 (FIG. 2) and thus to air springs 24, thereby inflating the air springs. When control arm 48 is in an exhaust position range C, height control valve 34 exhausts air from air springs 24 via air spring conduits 42, and communicates the exhausted air to exhaust conduit 46 and thus to atmosphere.

Automatic actuation of control arm 48, and thus activation of the operation of height control valve 34, is provided by a control arm link 50, as shown in FIG. 1. More specifically, control arm link 50 is pivotally connected at its upper end to control arm 48 via fasteners 52 or other means known in the art, and is also pivotally connected at its lower end to beam 18 via a mounting bracket 54 and fasteners 56, or to the bracket of a component that is attached to the beam, such as the bracket of brake chamber 30.

During vehicle operation, when axle/suspension system 10 articulates to an air spring compressed position, the distance between vehicle frame 12 and beam 18 decreases, compressing air spring 24. Since height control valve 34 is connected to hanger 16, which is rigidly connected to vehicle frame 12, the height control valve remains a substantially constant distance from the vehicle frame. To maintain design ride height, when the distance between vehicle frame 12 and beam 18 decreases, control arm link 50 moves control arm 48 upwardly from neutral position A to fill position range B, as shown in FIG. 3, thereby activating height control valve 34 and causing the height control valve to route compressed air from air reservoir conduit 38 to air springs 24 via air spring conduits 42 (FIG. 2), thereby inflating air springs 24, and in turn returning beam 18 to the design ride height.

Conversely, when axle/suspension system 10 articulates to an air spring extended position, the distance between vehicle frame 12 and beam 18 increases, extending air spring 24. To maintain ride height, when the distance between vehicle frame 12 and beam 18 increases, control arm link 50 moves control arm 48 downwardly from neutral position A to exhaust position range C, as shown in FIG. 3, thereby activating height control valve 34 and causing the height control valve to exhaust compressed air from air spring 24 via exhaust conduit 46, and in turn returning beam 18 to the design ride height.

As set forth above, prior art pneumatic control system 35 maintains the design ride height of axle/suspension system 10 when the axle/suspension system articulates during vehicle operation. Having now described the structure and operation of prior art pneumatic control system 35, another prior art pneumatic control system 60, which is generally identical to prior art control system 35 but which includes a solenoid valve 62 for exhausting rear air springs 24R of rear axle/suspension system 10, in order to increase the maneuverability of the heavy-duty vehicle during operation, will now be described.

Figure 4:
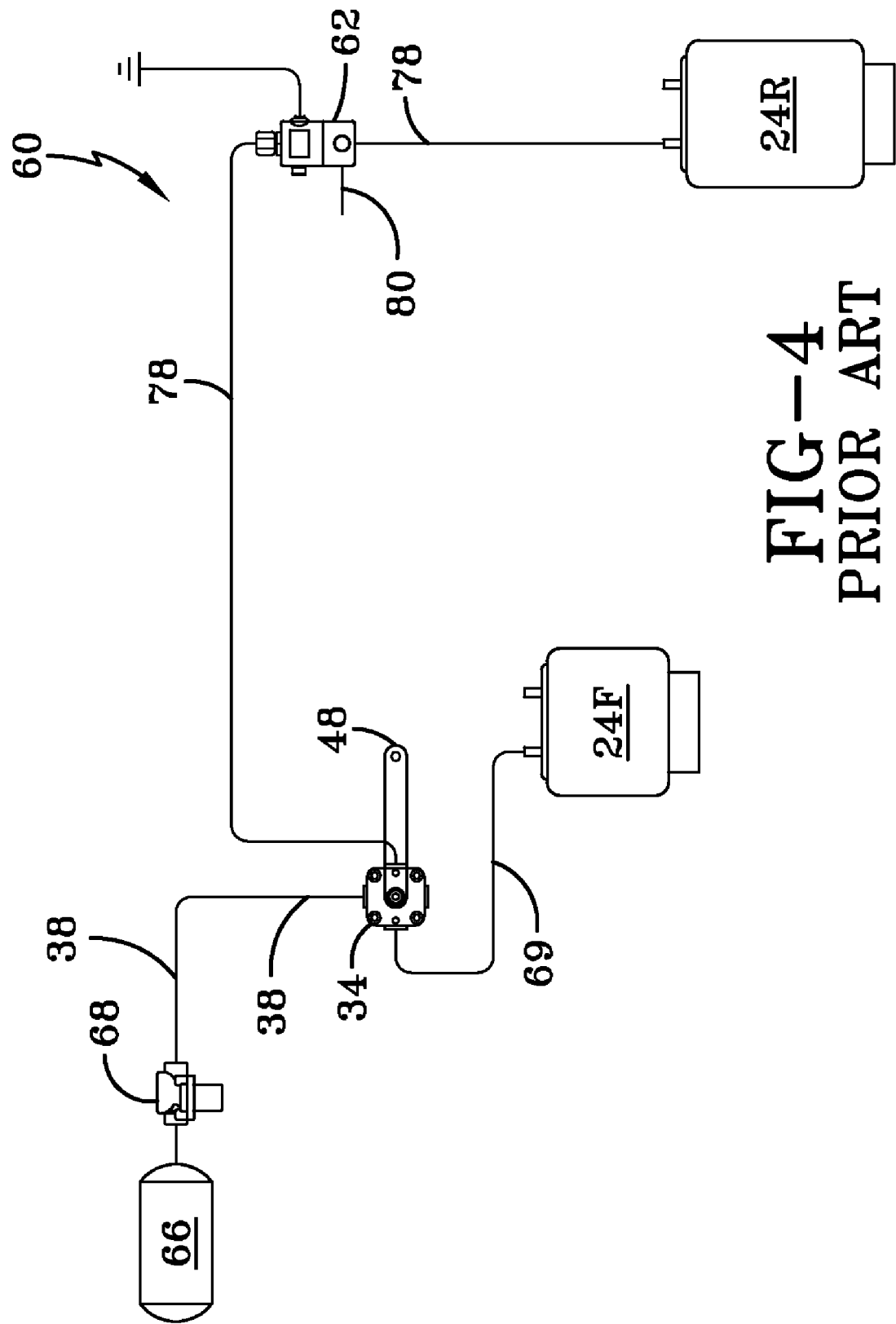
FIG. 4 is a schematic representation of a prior art pneumatic control system similar to the one shown in FIG. 2, but showing the pneumatic control system having a solenoid valve, in fluid communication with the height control valve and one of the rear air springs of the rear axle/suspension system, for exhausting air from the rear air spring.

Turning now to FIG. 4, prior art pneumatic control system 60 is shown schematically and will now be described. As set forth above, prior art pneumatic control system 60 differs from prior art pneumatic control system 35 because it includes a pressure protection valve 68 and solenoid valve 62 for exhausting rear air springs 24R (only one shown) of rear axle/suspension system 10. More particularly, prior art pneumatic control system 60 includes an air reservoir 66, pressure protection valve 68, solenoid valve 62, and height control valve 34 in fluid communication with a pair of rear air springs 24R (only one shown) and with a pair of front air springs 24F (only one shown). More specifically, air reservoir 66 is in fluid communication with height control valve 34 via air reservoir conduit 38, as set forth above for prior art pneumatic control system 35. Pressure protection valve 68 is disposed between and in fluid communication with air reservoir 66 and height control valve 34 via air reservoir conduit 38. Pressure protection valve 68 is a typical pressure protection valve which shuts off the supply of air through air reservoir conduit 38 from air reservoir 66 when the pressure in the air reservoir drops below a pre-set value, typically 70 p.s.i., and is well known to those having skill in the art.

Height control valve 34 is in fluid communication with front and rear air springs 24F,R (only one of each shown) of front and rear axle/suspension systems 10, respectively. More particularly, height control valve 34 is in fluid communication with a rear air spring conduit 78 which in turn is in fluid communication with rear air springs 24R (only one shown). Height control valve 34 also is in fluid communication with front air springs 24F (only one shown) via a front air spring conduit 69. Solenoid valve 62 is in fluid communication with rear air spring conduit 78, which in turn is disposed between and in fluid communication with height control valve 34 and rear air springs 24R. Solenoid valve 62 is a typical solenoid valve well known to those having skill in the art and includes an exhaust port 80 which opens to atmosphere. Solenoid valve 62 is electrically connected to a control mechanism (not shown) which is typically located in the cab (not shown) of the vehicle. When the operator of the vehicle, which has been loaded with cargo, desires to increase the maneuverability of the heavy-duty vehicle, such as when the operator encounters an urban driving setting or a loading/unloading situation, the operator manually activates the control mechanism (not shown), which is typically an electrical switch or button, to activate prior art pneumatic control system 60. More particularly, when pneumatic control system 60 is activated, solenoid valve 62 is energized to prevent the flow of fluid from height control valve 34, through rear air spring conduit 78 and into rear air springs 24R (only one shown), and instead allows fluid to flow from the rear air springs and the rear air spring conduit into exhaust port 80 of the solenoid valve and to atmosphere. Therefore, by activating the control mechanism (not shown) connected to pneumatic control system 60 of the prior art, the operator of the vehicle is able to dump or exhaust air from rear air springs 24R (only one shown) of rear axle/suspension system 10 of the vehicle which effectively transfers the weight of the trailer onto front air springs 24F (only one shown), which in turn increases the maneuverability of the vehicle.

As set forth above, prior art pneumatic control system 60 typically exhausts all of the air from rear air springs 24R. By exhausting all of the air from rear air springs 24R of rear axle/suspension system 10, the trailer longitudinal wheelbase is effectively shortened, as the cargo load which had previously been imparted on both front and rear axle/suspension systems 10 of the trailer is shifted to the front axle/suspension system. This effective shortening of the longitudinal wheel base of the heavy-duty vehicle increases the maneuverability of the vehicle.

As mentioned above, a potential disadvantage of prior art height control valve 34 used in pneumatic control system 60 is its inability to signal or control the exhaustion of air when the vehicle operator performs a complete exhaust or dump of rear air springs 24R of rear axle/suspension system 10 in order to increase the maneuverability of the vehicle, which can potentially lead to overload of front air springs 24F (only one shown) of the front axle/suspension system. Yet another potential disadvantage of prior art height control valve 34 used in pneumatic control system 60 is that the height control valve takes a significant amount of time to re-inflate air springs 24F,R following the dump or exhaustion of the air springs of rear axle/suspension system 10, such that the vehicle is not air supported or only partially air supported at below design ride height with limited suspension travel for a significant period of time, which can lead to undesirable wear of and possible premature failure of the components of the axle/suspension systems. These disadvantages of prior art height control valve 34 used in pneumatic control system 60 have created a need in the art for a height control valve that is capable of controlling exhaustion of the air springs of the rear axle/suspension system 10 when a secondary ride height has been achieved, and which provides an additional air boost in order to quickly re-inflate air springs 24F,R of the front and rear axle/suspension systems so that the vehicle is quickly returned to the primary or design ride height. The present invention satisfies these needs, as will now be described.

Figure 5:
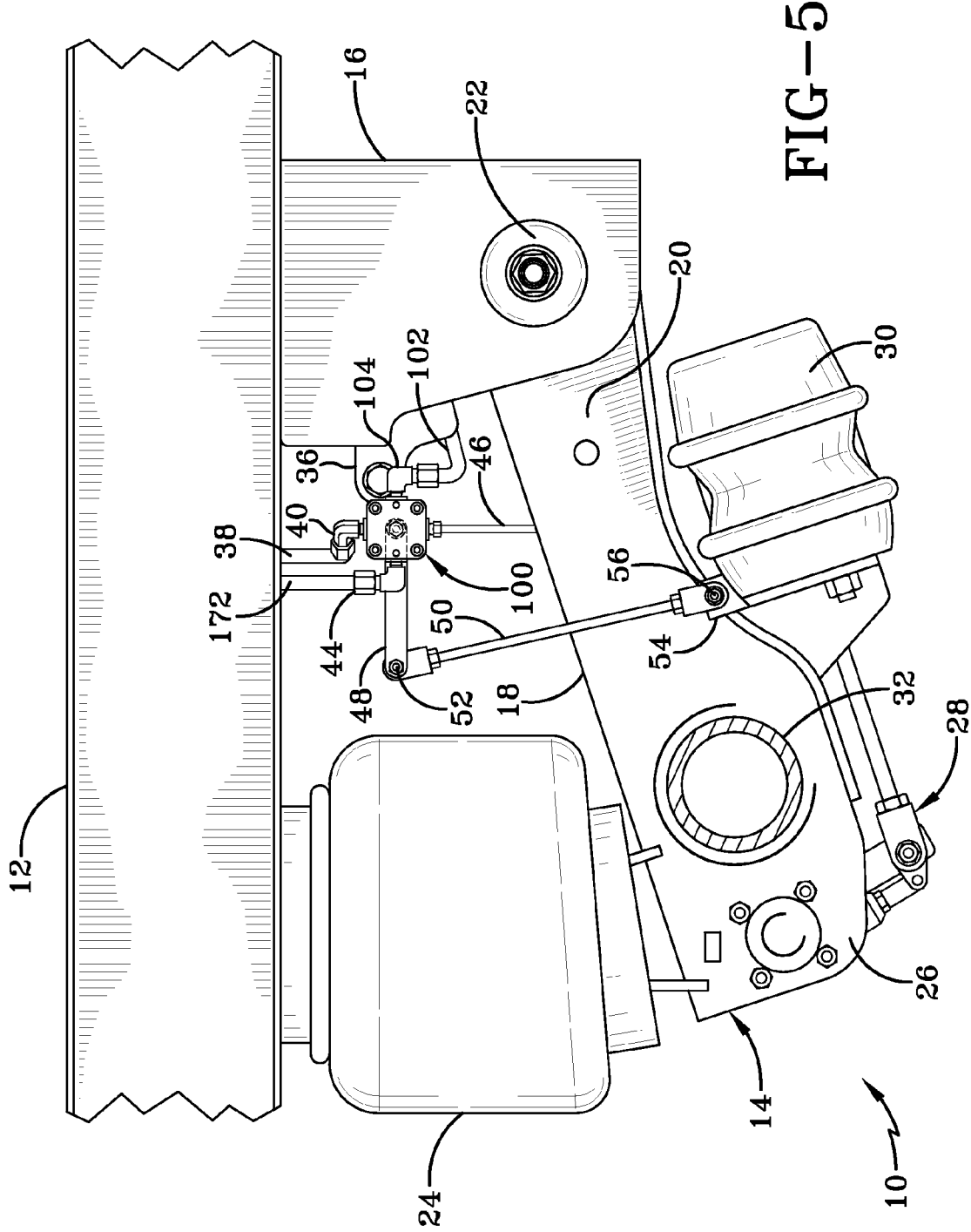
FIG. 5 is a fragmentary elevational view, with portions in section, of one of the suspension assemblies and an axle of an air-ride trailing arm beam-type axle/suspension system, shown depending from a heavy-duty vehicle frame, and further showing the first embodiment multi-stage height control valve for vehicle air springs of the present invention mounted on the suspension assembly of the air-ride trailing arm beam-type axle/suspension system.
Figure 12:
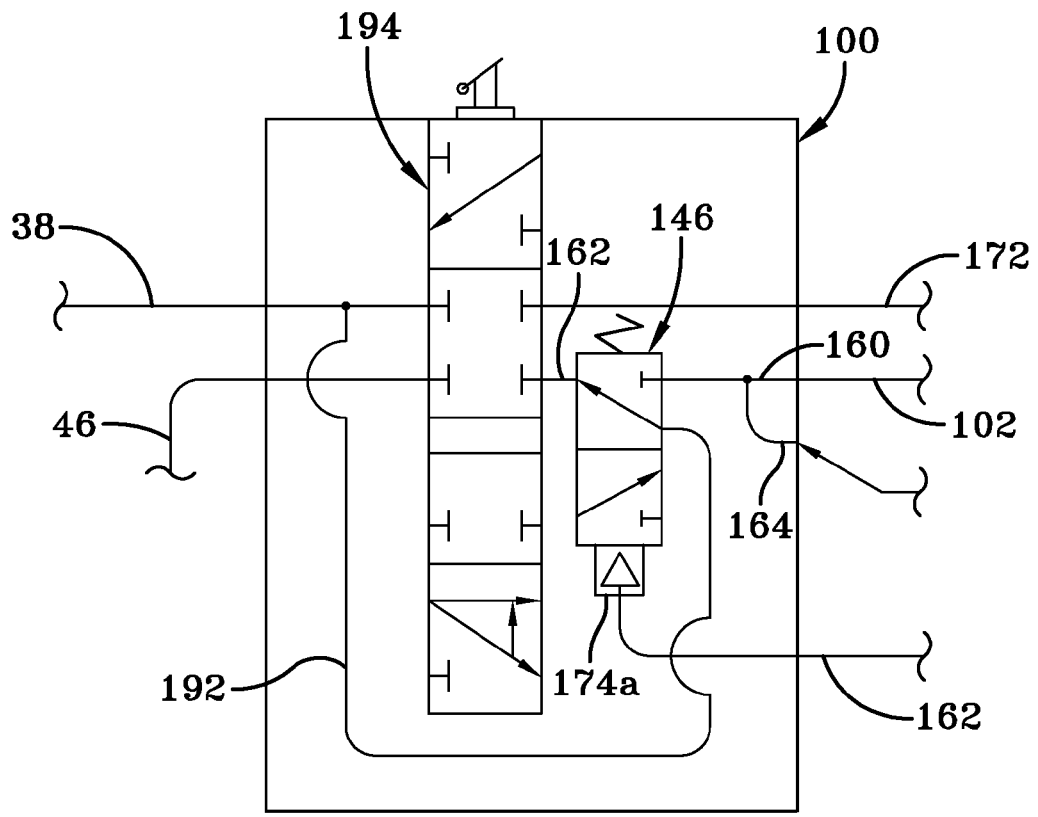
FIG. 12 is a schematic view of the first embodiment multi-stage height control valve shown in FIG. 5, and showing the rotor valve integrated with the pilot boost valve.
Figure 13:
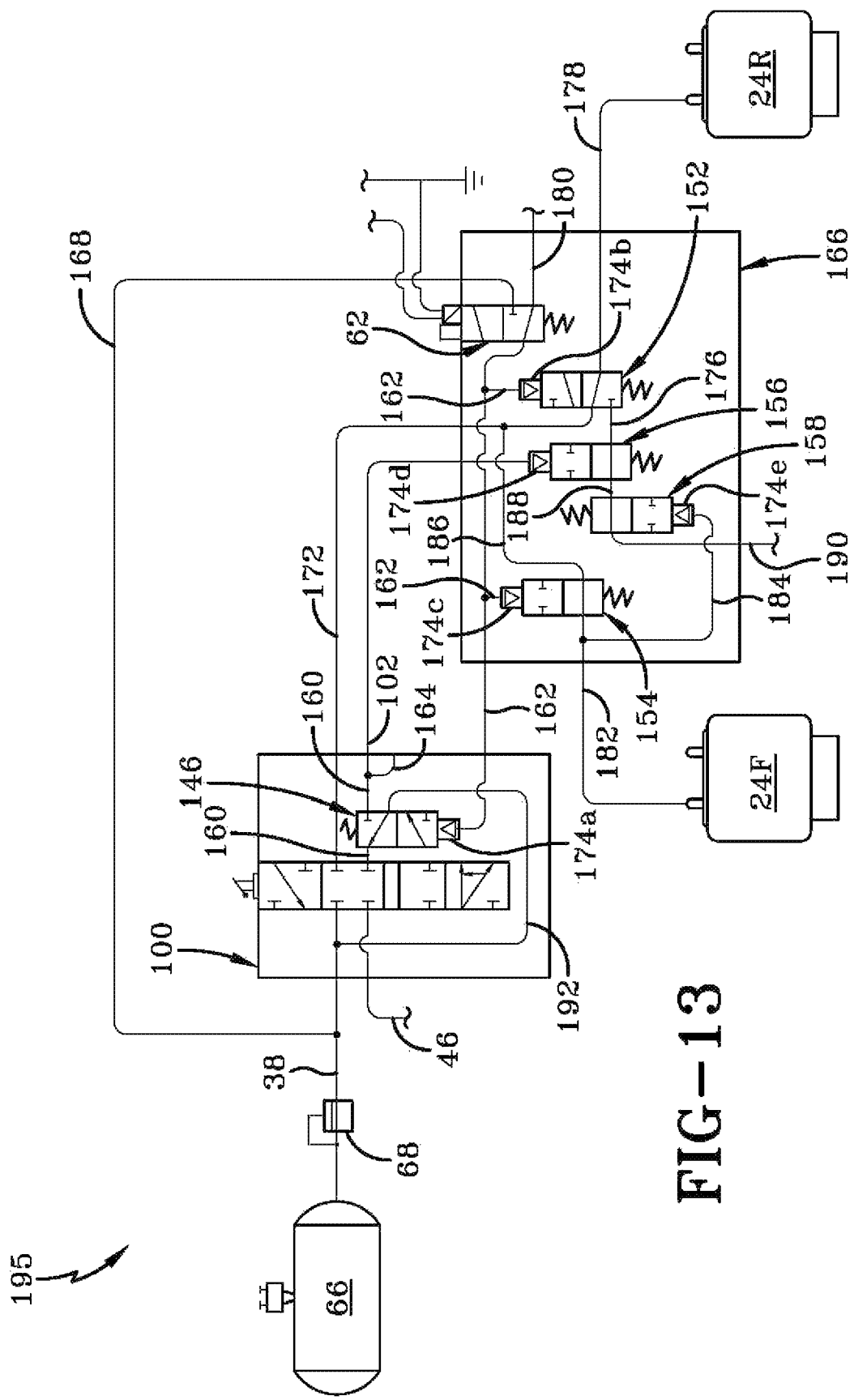
FIG. 13 is a schematic view of the first embodiment multi-stage height control valve shown in FIG. 12 incorporated into a pneumatic control system.

Turning now to FIGS. 5 and 12, a first exemplary embodiment multi-stage height control valve for air springs of the present invention is shown and is indicated generally at 100. The general appearance, arrangement, installation, and operation of height control valve 100 of the present invention is similar in many respects to prior art height control valve 34 shown in FIGS. 1-3 and described hereinabove; however, differences between present invention height control valve 100 and prior art height control valve 34 will be set forth hereinbelow. Moreover, like prior art height control valve 34 which was used in conjunction with prior art pneumatic control system 60, multi-stage height control valve 100 of the present invention is utilized in conjunction with a pneumatic control system 195 (FIG. 13). The structure of pneumatic control system 195 including its similarities and differences with respect to prior art pneumatic control system 60 is discussed below.

Height control valve 100 is mounted on hanger 16 via bracket 36 and a secondary spacer (not shown). Air reservoir conduit 38, which is in fluid communication with height control valve 100 via air reservoir fitting 40 (FIG. 5), provides compressed air to the height control valve from air reservoir 66 (FIG. 13), such as an air tank, as known to those skilled in the art. With continuing reference to FIGS. 5 and 12, a ride height conduit 172 is in fluid communication with height control valve 100 via air spring fitting 44 (FIG. 5), and the conduit branches off, via a rear air spring conduit 178 and a front air spring conduit 182 (FIG. 12), to each of front and rear air springs 24F,R, enabling the height control valve to route compressed air to and from the air springs based on certain operational conditions, as will be described below. Exhaust conduit 46 is in fluid communication with and extends from height control valve 100, enabling the height control valve to exhaust compressed air to atmosphere, as will be described in detail below. A secondary ride height pilot conduit 102 is in fluid communication with height control valve 100 via a pilot fitting 104 (FIG. 5).

Figure 7A:
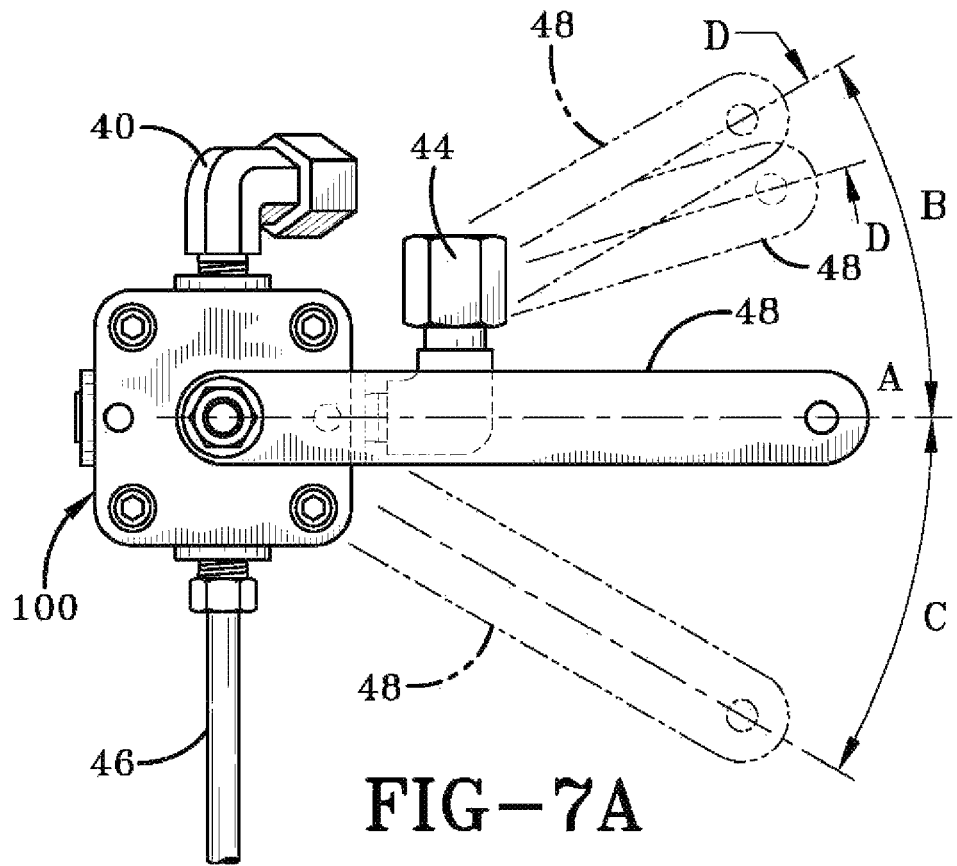
FIG. 7A is an enlarged elevational view of the first embodiment multi-stage height control valve for vehicle air springs shown in FIG. 5, with the range of various valve control arm positions represented by broken lines and arrows.
Figure 8:
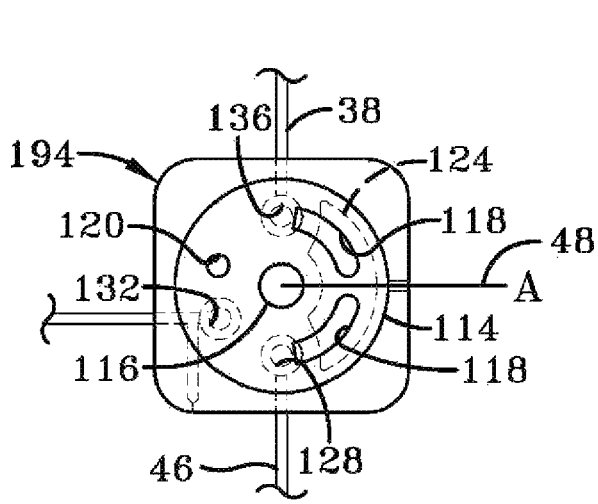
FIG. 8 is a schematic elevational view of the rotor valve of the first embodiment multi-stage height control valve shown in FIGS. 6 and 7, with hidden portions represented by broken lines and showing the relative positions of the various rotor valve openings when the control arm is in the neutral position.

Multi-stage height control valve 100 includes a flow control means or rotor valve portion 194 and a pilot boost valve portion 146. The structure of rotor valve portion 194 of multistage height control valve 100 is shown in FIGS. 6-7, and will now be described. Rotor valve portion 194 of multi-stage height control valve 100 of the present invention is a four position, four-way valve that includes control arm 48, wherein the position of the control arm controls the operation of the height control valve. More particularly, rotor valve portion 194 of height control valve 100 includes a generally box-shaped valve body first half 106 (FIG. 7) which is fixedly attached to a generally box-shaped valve body second half 122 (FIG. 6). Valve body first half 106 includes four continuous openings 108a, with each one of the openings being formed in a respective one of the four corners of the valve body first half. A bolt 110 is passed through each one of openings 108a. A generally cylindrical chamber 112 is formed in valve body first half 106. A generally flattened circular recess 144 is also formed in valve body first half 106 and is disposed about chamber 112. A generally circular disc-shaped valve rotor 114 having a key-shaped opening 143 centered in the valve rotor fixedly engages a mating key-shaped central portion 145 of a valve axle 116. Valve axle 116 in turn rotatably extends through and outwardly from valve body first half 106 and includes a threaded upper end (not shown). A nut (not shown) threadably engages the threaded upper end of valve axle 116 to fixedly attach the axle to control arm 48, in a manner well known to those having skill in the art. Valve rotor 114 also is formed with a pair of arcuate-shaped openings 118.

In accordance with a key feature of the present invention, a circular pilot rotor opening 120 is formed in valve rotor 114, as shown in FIG. 7. Pilot rotor opening 120 provides an additional path for air to flow through valve rotor 114, the operation of which will be described below. As set forth above, height control valve 100 also includes generally box-shaped valve body second half 122 formed with four threaded openings 108b, with each of the threaded openings being formed in one of the four corners of the valve body second half and aligned with respective ones of openings 108a of valve body first half 106. Valve body second half 122 includes an arcuate-shaped chamber 124 which is in fluid communication with a threaded air spring port 126. Air spring port 126 in turn is threadably engaged by air spring fitting 44 (FIG. 5). Air spring fitting 44 is in fluid communication with ride height conduit 172 (FIG. 13) and generally allows air to flow from height control valve 100, through air spring fitting 44 and into the ride height conduit 172. Valve body second half 122 further includes an exhaust opening 128 which is in fluid communication with a threaded exhaust port 130. Exhaust port 130 in turn is threadably engaged by exhaust conduit 46 (FIG. 5), and generally allows air to flow from height control valve 100 through exhaust conduit 46 and to atmosphere. Valve body second half 122 further includes a pilot opening 132 which is in fluid communication with a threaded pilot port 134. Pilot port 134 in turn is threadably engaged by pilot fitting 104 which is in fluid communication with secondary ride height conduit 102 (FIG. 5) and generally allows air to flow from height control valve 100 through the secondary ride height conduit. Valve body second half 122 further includes a reservoir opening 136 which is in fluid communication with a threaded reservoir port 138. Reservoir port 138 is in turn threadably engaged by air reservoir fitting 40 (FIG. 5). Air reservoir fitting 40 is in fluid communication with air reservoir conduit 38 and generally allows air to flow from the air reservoir conduit to height control valve 100 (FIG. 5). An elastomeric O-ring 140 is seated in a circular groove 141 formed in valve body second half 122 and generally surrounds chamber 124, exhaust opening 128, pilot opening 132, and reservoir opening 136. A circular opening 142 is formed in the center of valve body second half 122. Opening 142 receives valve axle 116 of valve body first half 106. Bolts 110 threadably engage threaded openings 108b of valve body second half 122 such that the valve body first half and the valve body second half are fixedly attached to one another, and closely abutting one another. This close abutting relationship of valve body first half 106 and valve body second half 122 allows O-ring 140 of the valve body second half to cooperate with recess 144 of the valve body first half to create an air tight fit.

Turning now to FIGS. 7A-11, the operation of rotor valve portion 194 of height control valve 100 of the present invention will now be described. When the vehicle is at design ride height and control arm 48 of rotor valve portion 194 is in horizontal or neutral position A (FIG. 8), the rotor valve portion of height control valve 100 is closed and does not allow air to pass through any of the control valve ports: air spring port 126, exhaust port 130, pilot port 134 or reservoir port 138. This prohibits the flow of compressed air from air reservoir 66 to front and rear air springs 24F,R via reservoir port 138 and air spring port 126 which is in fluid communication with ride height conduit 172 (FIG. 13). It also prohibits the exhaustion of air from the air springs to atmosphere via air spring port 126 and exhaust port 128 which is in fluid communication with exhaust conduit 46. More particularly, when control arm 48 is in neutral position A (FIG. 8), arcuate-shaped openings 118 of valve rotor 114 are in fluid communication with arcuate-shaped chamber 124 of valve body second half 122, but are not in fluid communication with either exhaust opening 128 or reservoir opening 136. Pilot opening 120 of valve rotor 114 also is not in fluid communication with any of the openings of valve body second half 122, so that no air is communicated from exhaust port 130, pilot port 134, air spring port 126, or reservoir port 138 of the valve body second half. When front and rear air springs 24F,R have become compressed and control arm 48 is moved into fill position range B (FIG. 9), rotor valve portion 194 of height control valve 100 routes compressed air from air reservoir conduit 38 to ride height conduit 172 and thus to front and rear air springs 24F,R (FIG. 13), thereby inflating the air springs. More particularly, when control arm 48 is in fill position range B, one of the arcuate-shaped openings 118 of valve rotor 114 is in fluid communication with arcuate-shaped chamber 124 and also with reservoir opening 136. This allows air to be routed through rotor valve portion 194 of height control valve 100 from air reservoir port 138 through air reservoir opening 136, through arcuate opening 118 of valve rotor 114 and through arcuate-shaped chamber 124 to air spring port 126 and into air springs 24F,R via air spring conduit 172, rear air spring conduit 178 and front air spring conduit 182 (FIG. 13). When front and rear air springs 24F,R have become extended and control arm 48 is moved into exhaust position range C (FIG. 10), rotor valve portion 194 of height control valve 100 exhausts air from front and rear air springs 24F,R via exhaust conduit 46 and thus to atmosphere. More particularly, when control arm 48 is in exhaust position range C, one of the arcuate openings 118 of valve rotor 114 is in fluid communication with arcuate chamber 124 and also with exhaust opening 128. This allows air to be routed through rotor valve portion 194 of height control valve 100 from air spring port 126 through arcuate-shaped chamber 124, through arcuate-shaped opening 118, through exhaust opening 128, through exhaust port 130, and through exhaust conduit 46 to atmosphere.

In accordance with a key feature of the present invention, when front and rear air springs 24F,R become extremely compressed and control arm 48 has reached a secondary ride height position range D (FIG. 11, 7A), located within fill position range B, rotor valve portion 194 of height control valve 100 routes compressed air from air reservoir conduit 38 to ride height conduit 172 and thus to front and rear air springs 24F,R, via rear air spring conduit 178 and front air spring conduit 182, thereby inflating the air springs and also routes air from the reservoir conduit to secondary ride height conduit 102 and pilot boost valve 146 (FIG. 13). More particularly, when control arm 48 is in secondary ride height position range D, one of arcuate-shaped openings 118 is in fluid communication with arcuate-shaped chamber 124 and reservoir opening 136, and rotor pilot opening 120 is in fluid communication with pilot opening 132. This allows air to be routed through rotor valve portion 194 of height control valve 100 from reservoir opening 136 through arcuate-shaped opening 118 and pilot rotor opening 120 to arcuate-shaped chamber 124 and pilot opening 132, respectively, the overall operation of which, within a pneumatic control system 195, will be described below.

As set forth above, first embodiment multi-stage height control valve 100 includes both rotor valve portion 194 and boost valve 146, which will now be described. Turning to FIGS. 12 and 13, multi-stage height control valve 100 is shown schematically with rotor valve portion 194 and pilot boost valve 146. Pilot boost valve 146 of height control valve 100 is a two position, three way pilot valve well known to those having skill in the relevant art. Boost valve 146 includes a pilot port 174a which is piloted by an integrated load proportioning valve 166 via a boost pilot conduit 162. Pilot boost valve 146 is in fluid communication with pilot opening 132 (FIG. 6) and pilot port 134 via an internal pilot conduit 160. Boost valve 146 is also in fluid communication with air reservoir 66 via air reservoir conduit 38 and a boost conduit 192. A bleed conduit 164 is in fluid communication with secondary ride height conduit 102 and with atmosphere. Bleed conduit 164 allows pressure in secondary ride height conduit 102 to bleed to atmosphere which prohibits pressurized air from becoming trapped in the secondary ride height conduit when boost valve 146 returns to its normal operating condition. The general operation of boost valve 146 within height control valve 100 will be described below.

First exemplary embodiment multi-stage height control valve 100 of the present invention is used in a pneumatic control system 195 (FIG. 13). Pneumatic control system 195 is similar in many respects to prior art pneumatic control system 60 but it is different in other respects. The differences between pneumatic control system 195 and prior art pneumatic control system 60 will be described in detail below. Like prior art pneumatic control system 60, pneumatic control system 195 includes air reservoir 66 which is in fluid communication with multi-stage height control valve 100 via air reservoir conduit 38. Pressure protection valve 68 is in fluid communication with air reservoir conduit 38. Pneumatic control system 195 includes integrated control/warning device or proportioning valve 166 which is in fluid communication with front and rear air springs 24F,R (only one of each shown), via front and rear air spring conduits 182,178, respectively. Integrated proportioning valve 166 is also in fluid communication with air reservoir 66 via a proportioning valve conduit 168 which is in fluid communication with air reservoir conduit 38. Integrated proportioning valve 166 is further in fluid communication with multi-stage height control valve 100 via ride height conduit 172, secondary ride height conduit 102, and boost pilot conduit 162, as will be described in detail below.

With continuing reference to FIG. 13, integrated proportioning valve 166 includes solenoid valve 62 which is in fluid communication with air reservoir 66 via proportioning valve conduit 168 and air reservoir conduit 38 which are in fluid communication with each other. Solenoid valve 62 is also in fluid communication with pilot ports 174b,c, of a first and second pilot valve 152,154, respectively, and is in fluid communication with boost pilot valve 146 via boost pilot conduit 162. Solenoid valve 62 is further in fluid communication with atmosphere via a solenoid exhaust conduit 180.

First pilot valve 152, second pilot valve 154, and boost pilot valve 146 are piloted by solenoid valve 62 via boost pilot conduit 162. First pilot valve 152 is a two position, three-way pilot valve which is in fluid communication with multi-stage height control valve 100 via ride height conduit 172, is in fluid communication with a third pilot valve 156 via a first internal conduit 176, and is in fluid communication with rear air spring 24R via rear air spring conduit 178. In an unpiloted state, first pilot valve 152 routes air from multi-stage height control valve 100 via ride height conduit 172 to rear air spring 24R via rear air spring conduit 178. In a piloted state, first pilot valve 152 routes air from rear air spring 24R via rear air spring conduit 178 to third pilot valve 156 via first internal conduit 176.

Second pilot valve 154 is a two position, two-way pilot valve which, as set forth above, is piloted by solenoid valve 62 via boost pilot conduit 162. Second pilot valve 154 is in fluid communication with front air spring 24F via front air spring conduit 182. Second pilot valve 154 is also in fluid communication with a pilot port 174e of a fourth pilot valve 158 via a second internal conduit 184 and air spring conduit 182. Second pilot valve 154 is also in fluid communication with multi-stage height control valve 100 via a third internal conduit 186 and ride height conduit 172. In an unpiloted state, second pilot valve 154 routes air from multi-stage height control valve 100 via ride height conduit 172 and third internal conduit 186 to front air spring 24F and to pilot port 174e of fourth pilot valve 158 via front air spring conduit 182 and second internal conduit 184. In a piloted state, second pilot valve 154 prohibits air flow from multi-stage height control valve 100 to front air spring 24F and pilot port 174e of fourth pilot valve 158.

Third pilot valve 156 is a two position, two-way pilot valve having a pilot port 174d which is in fluid communication with multi-stage height control valve 100 via secondary ride height conduit 102. As set forth above, third pilot valve 156 is in fluid communication with first pilot valve 152 via first internal conduit 176 and also with fourth pilot valve 158 via a fourth internal conduit 188. In an unpiloted state, third pilot valve 156 routes air from first pilot valve 152 via first internal conduit 176 to fourth pilot valve 158 via fourth internal conduit 188. In a piloted state, third pilot valve 156 prohibits air flow from first pilot valve 152 to fourth pilot valve 158. Fourth pilot valve 158 is a two position, two-way pilot valve which, as set forth above, is in fluid communication with third pilot valve 156 via fourth internal conduit 188 and with atmosphere via a fifth internal conduit 190.

Having now described the structure of first embodiment multi-stage height control valve 100 and pneumatic control system 195 in which the height control valve is used, the operation of the height control valve of the present invention within the pneumatic control system will now be described. Automatic actuation of control arm 48, and thus activation of the operation of height control valve 100, is provided by control arm link 50, as shown in FIG. 5. More specifically, control arm link 50 is pivotally connected at its upper end to control arm 48 via fasteners 52 or other means known in the art, and is also pivotally connected at its lower end to beam 18 via mounting bracket 54 and fasteners 56, or to a bracket of a component that is attached to the beam, such as the bracket of brake chamber 30.

Figure 9:
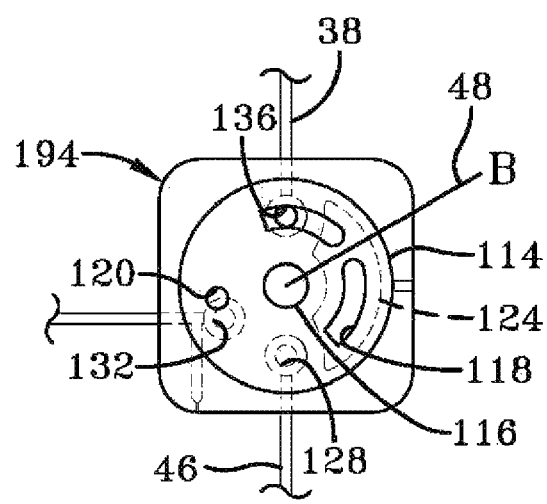
FIG. 9 is a view similar to FIG. 8, but showing the relative positions of the various rotor valve openings when the control arm is in the fill position range.

During normal vehicle operation, when solenoid valve 62 is de-energized, as axle/suspension system 10 articulates to an air spring compressed position, the distance between vehicle frame 12 and beam 18 decreases, compressing air spring 24. Since height control valve 100 is connected to hanger 16, which is rigidly connected to vehicle frame 12, the height control valve remains a generally constant distance from the vehicle frame. To maintain design ride height, when the distance between vehicle frame 12 and beam 18 decreases, control arm link 50 moves control arm 48 upwardly from neutral position A to fill position range B, as shown in FIG. 9, thereby activating height control valve 100 and causing the height control valve to route compressed air from air reservoir conduit 38 to front and rear air springs 24F,R via ride height conduit 172, rear air spring conduit 178, third internal conduit 186, and front air spring conduit 182 (FIG. 13), thereby inflating the front and rear air springs, and in turn returning beam 18 to the design ride height.

Figure 10:
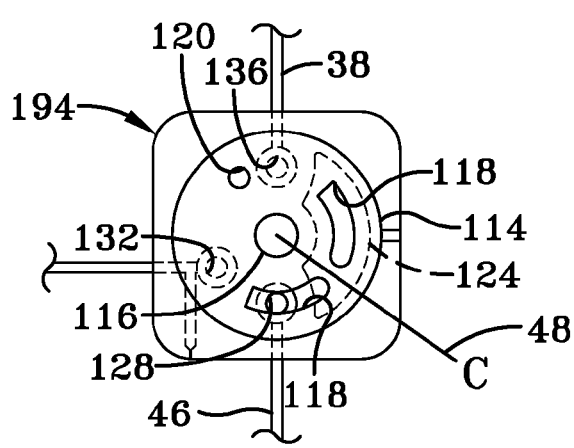
FIG. 10 is a view similar to FIGS. 8 and 9, but showing the relative positions of the various rotor valve openings when the control arm is in the exhaust position range.
Figure 11:
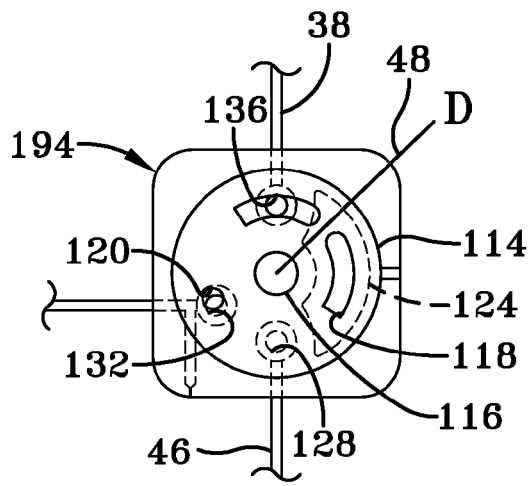
FIG. 11 is a view similar to FIGS. 8, 9, and 10, but showing the relative positions of the various rotor valve openings when the control arm is in the secondary ride height position range and also still within the fill position range.

Conversely, when axle/suspension system 10 articulates to an air spring extended position, the distance between vehicle frame 12 and beam 18 increases, extending air spring 24. To maintain ride height, when the distance between vehicle frame 12 and beam 18 increases, control arm link 50 moves control arm 48 downwardly from neutral position A to exhaust position range C, as shown in FIG. 10, thereby activating height control valve 100 and causing the height control valve to exhaust compressed air from front and rear air springs 24F,R via rear air spring conduit 178, front air spring conduit 182, ride height conduit 172, and exhaust conduit 46, and in turn returning beam 18 to the design ride height.

With continuing reference to FIG. 13, a key feature of the present invention will now be described. When the operator of the vehicle desires to exhaust rear axle/suspension system 10 of the vehicle in order to transfer loads from the rear axle suspension system to the front axle/suspension system to shorten the wheelbase of the trailer in order to increase maneuverability of the vehicle, the operator actuates a switch (not shown) which is electrically connected to solenoid valve 62, which in turn energizes the solenoid valve into its second position. In this position, air is routed from air reservoir 66 via air reservoir conduit 38 and proportioning valve conduit 168 to pilot ports 174b,c of first pilot valve 152 and second pilot valve 154, respectively, of integrated load proportioning valve 166 and also to the pilot port of boost pilot valve 146 of multi-stage height control valve 100 via boost pilot conduit 162. Piloted first valve 152 routes air from rear air spring 24R to third pilot valve 156. If third pilot valve 156 is unpiloted by multi-stage height control valve 100 via secondary ride height pilot conduit 102, air is then routed to fourth pilot valve 158 via fourth internal conduit 188. If fourth pilot valve 158 is unpiloted by front air spring 24F via front air spring conduit 182 and second internal conduit 184, air is routed through fifth internal conduit 190 to atmosphere. As air is routed from rear air springs 24R along the path set forth above to atmosphere, the vehicle ride height begins to lower and trailer loads are transferred from rear axle/suspension system 10 to the front axle/suspension system. As the vehicle lowers, front axle/suspension system 10 articulates to an air spring compressed position and the distance between vehicle frame 12 and beam 18 decreases, compressing front air spring 24F. Since height control valve 100 is connected to hanger 16, which is rigidly connected to vehicle frame 12, the height control valve remains a generally constant distance from the vehicle frame. When the distance between vehicle frame 12 and beam 18 decreases, control arm link 50 moves control arm 48 upwardly from neutral position A to fill position range B, as shown in FIG. 9. However, because solenoid valve 62 is still energized and piloting first pilot valve 152, second pilot valve 154 and boost pilot valve 146, the first and third pilot valves prevent air from being routed from height control valve 100 to front and rear air springs 24F,R. Therefore, the vehicle ride height will continue to drop until height control valve 100 reaches the secondary ride height range D, shown in FIGS. 11 and 7A.

Once control arm 48 is raised to secondary ride height range D (FIG. 11), air is directed by height control valve 100 through pilot opening 132 into pilot port 134, through secondary ride height conduit 102 to pilot port 174d of third pilot valve 156. Once piloted, third pilot valve 156 prohibits further air flow from rear air spring 24R to atmosphere, prohibiting any further decrease in the vehicle ride height. This is important because it allows multi-stage height control valve 100 to control the exhaustion of air from rear air springs 24R, avoiding the problems associated with the prior art, such as overloading of front air springs 24F and/or causing the vehicle to ride on the jounce stops or bumpers of the front and/or rear air springs.

When the operator of the vehicle actuates the switch (not shown) to de-energize solenoid valve 62 of integrated proportioning valve 166, in order to once again raise the vehicle to the primary design ride height, the solenoid valve is de-energized and first pilot valve 152, second pilot valve 154 and boost pilot valve 146 are returned to their unpiloted state. When this occurs, air is once again directed by height control valve 100 from air reservoir 66 to front and rear air springs 24F,R via ride height conduit 172, rear air spring conduit 178, third internal conduit 186, and front air spring conduit 182, allowing the front and rear air springs to reach equilibrium with one another. In addition, unpiloted boost valve 146 provides an air boost from air reservoir 66 through air reservoir conduit 38 and boost conduit 192 to front and rear air springs 24F,R via ride height conduit 172, rear air spring conduit 178 and front air spring conduit 182. This air boost allows front and rear air springs 24F,R to quickly re-inflate in order to more quickly achieve the primary design ride height. This avoids the relatively long inflation times which were typical to prior art pneumatic control systems such as pneumatic control system 60.

As can be seen in the above description, multi-stage height control valve 100 of the present invention provides a secondary ride height pilot signal capability which is internal to the height control valve and which can be directed to control an event or process which is external to the height control valve. In the preferred embodiment, multi-stage height control valve 100 uses the secondary ride height pilot signal capability to control the exhaustion of air from rear air springs 24R based on a secondary ride height range D. Height control valve 100 also provides a boost capability which allows for front and rear air springs 24F,R to re-inflate quickly, which reduces the potential for premature axle/suspension system component failure caused by the vehicle riding on the bumpers of the front and rear air springs.

Figure 14:
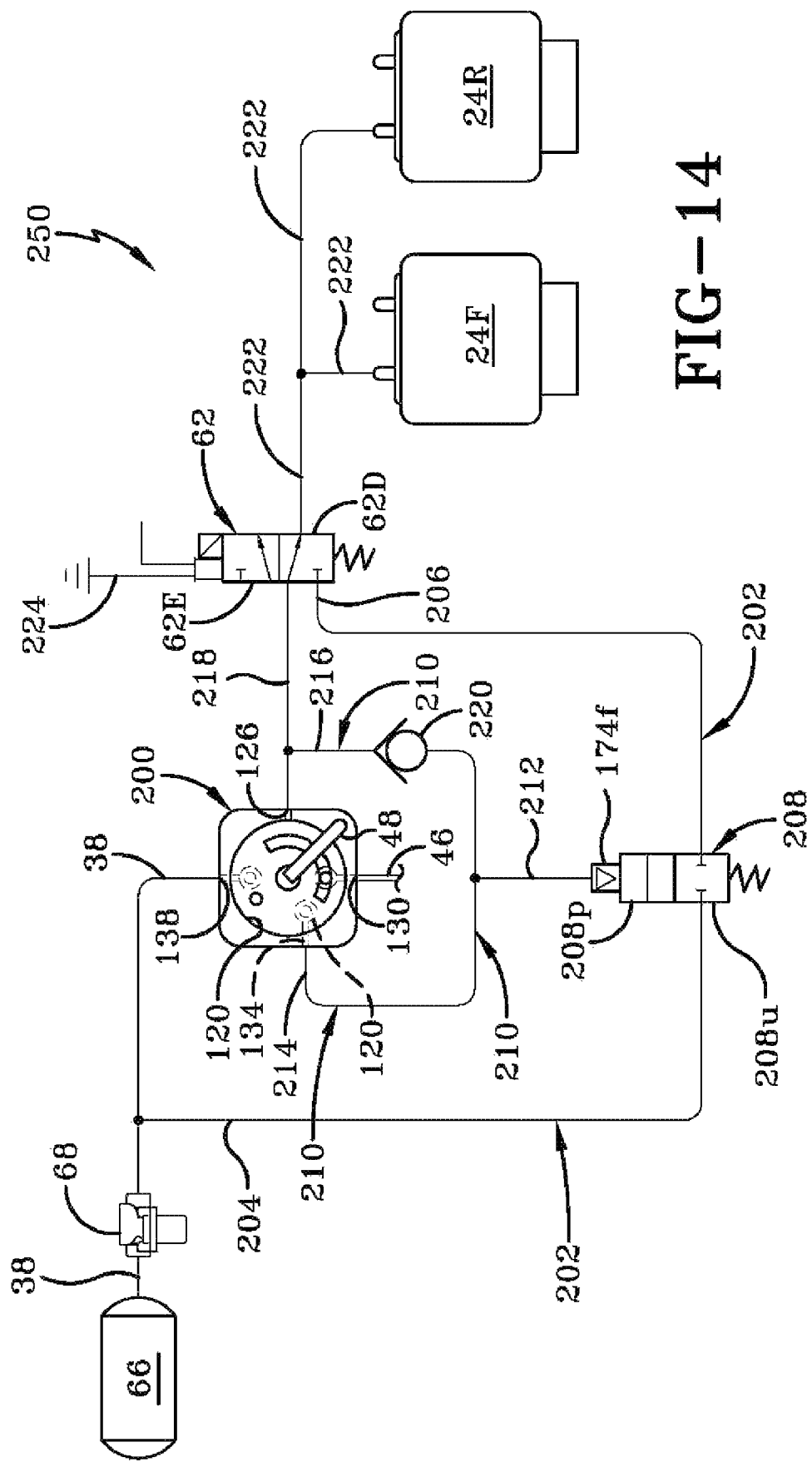
FIG. 14 is a schematic view of the second embodiment multi-stage height control valve for vehicle air springs of the present invention, shown incorporated into a pneumatic control system.

Turning now to FIG. 14, a second embodiment multi-stage height control valve 200 of the present invention is schematically shown being used in conjunction with a pneumatic control system 250 for drop deck trailers. Second preferred embodiment height control valve 200 is similar in many respects to first embodiment multi-stage height control valve 100, but it is also different in certain other respects. For purposes of clarity, only the differences between height control valve 200 and height control valve 100 will be described below.

Figure 15:
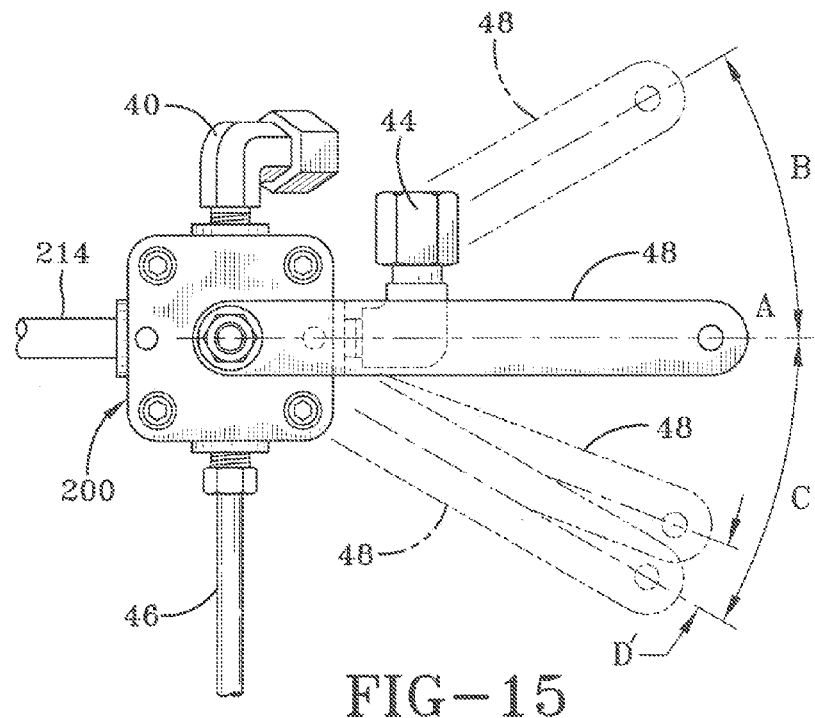
FIG. 15 is an enlarged elevational view of the second embodiment multi-stage height control valve for vehicle air springs, with the range of various valve control arm positions represented by broken lines and arrows.

Second preferred embodiment height control valve 200 of the present invention includes only flow control means or rotary valve portion 194 and does not include integral boost pilot valve 146. Because height control valve 200 does not include integral boost pilot valve 146, it also does not include boost pilot conduit 162, boost conduit 192, internal pilot conduit 160, nor bleed conduit 164. The principle difference between second embodiment height control valve 200 and first embodiment height control valve 100 is the location of pilot rotor opening 120 on valve rotor 114. In height control valve 200, pilot rotor opening 120 is positioned so that the pilot rotor opening is in fluid communication with pilot opening 132 when control arm 48 is in a secondary ride height position range D', as shown in FIGS. 14 and 15. Secondary ride height position range D' defines a position of control arm 48 which is generally opposite secondary ride height position range D of first embodiment height control valve 100. As a result, secondary ride height position range D' is located within exhaust position range C of control arm 48. As set forth above, height control valve 200 is preferably used in conjunction with pneumatic control system 250 for drop deck trailers. In order to better understand the structure and operation of second embodiment height control valve 200, the structure of pneumatic control system 250 for drop deck trailers will now be described in detail below.

Pneumatic control system 250 for drop deck trailers includes air reservoir 66 which is in fluid communication with multi-stage height control valve 200 via air reservoir conduit 38. More particularly, air reservoir conduit 38 is in fluid communication with reservoir port 138 of height control valve 200. Pressure protection valve 68 is disposed between and is in fluid communication with air reservoir 66 and height control valve 200 via air reservoir conduit 38. As set forth above, pressure protection valve 68 shuts off the supply of air through air reservoir conduit 38 from air reservoir 66 when the pressure in the air reservoir drops below a pre-set value, typically 70 p.s.i. A first end 204 of a first air spring conduit 202 is in fluid communication with and branches from air reservoir conduit 38. A second end 206 of first air spring conduit 202 is in fluid communication with solenoid valve 62. A control/warning device or pilot valve 208, is disposed along first air spring conduit 202 and is in fluid communication with the first air spring conduit.

Pilot valve 208 is a two-way pilot valve which includes a pilot port 174f. Pilot port 174f of pilot valve 208 is in fluid communication with a pilot-air spring conduit 210 via a connector conduit 212. In an unpiloted state 208U, pilot valve 208 prohibits air flow through first air spring conduit 202. In a piloted state 208P, pilot valve 208 allows air flow through first air spring conduit 202. Pilot-air spring conduit 210 is in fluid communication with multi-stage height control valve 200. More particularly, a first end 214 of pilot-air spring conduit 210 is in fluid communication with pilot port 134 of height control valve 200. A second end 216 of pilot-air spring conduit 210 is in fluid communication with a second air spring conduit 218.

A check valve 220 is disposed along pilot-air spring conduit 210 in such a manner so as to only allow air to flow through the pilot-air spring conduit from second end 216 to first end 214. Check valve 220 allows the flow of air from second air spring conduit 218 through pilot-air spring conduit 210 to pilot 174f of pilot valve 208. Second air spring conduit 218 is also in fluid communication with air spring port 126 of height control valve 200 and with solenoid valve 62. Solenoid valve 62 in turn is also in fluid communication with front and rear air springs 24F,R via a third air spring conduit 222 which is in fluid communication with the front and rear air springs (only one of each shown). Solenoid valve 62 is electrically connected to a cab switch (not shown) via a cable 224. When solenoid valve 62 is in a de-energized state 62D, fluid is allowed to flow from height control valve 200, through second air spring conduit 218, through the solenoid valve, through third air spring conduit 222, and into front and rear air springs 24F,R. When solenoid valve 62 is in an energized state 62E, fluid is allowed to flow from second end 206 of first air spring conduit 202, through the solenoid valve, through third air spring conduit 222 to front and rear air springs 24F,R. Exhaust conduit 46 is in fluid communication with exhaust port 130 of height control valve 200.

Having described the structure of pneumatic control system 250 for drop deck trailers which includes second embodiment height control valve 200 of the present invention, the operation of the second embodiment height control valve in conjunction with the pneumatic control system now will be described.

When pneumatic control system 250 is in its normal operating position and solenoid valve 62 is de-energized, height control valve 200 operates in the same general manner as height control valve 100 shown in FIG. 5. More particularly, height control valve 200 is activated by the automatic actuation of control arm 48 by control arm link 50. During normal vehicle operation, when solenoid valve 62 is de-energized, as axle/suspension system 10 articulates to an air spring compressed position, the distance between vehicle frame 12 and beam 18 decreases, compressing air spring 24. Because height control valve 200 is connected to hanger 16, which is rigidly connected to vehicle frame 12, the height control valve remains a generally constant distance from the vehicle frame.

To maintain design ride height, when the distance between vehicle frame 12 and beam 18 decreases, control arm link 50 moves control arm 48 upwardly from neutral position A to fill position range B, as shown in FIG. 15, thereby activating height control valve 200 and causing the height control valve to route compressed air from air reservoir conduit 38 to front and rear springs 24F,R via second air spring conduit 218, through solenoid valve 62, and through third air spring conduit 222 (FIG. 14), thereby inflating the front and rear air springs, and in turn returning beam 18 to the design ride height.

Conversely, when axle suspension system 10 articulates to an air spring extended position, the distance between vehicle frame 12 and beam 18 increases, extending air spring 24. To maintain ride height, when the distance between vehicle frame 12 and beam 18 increases, control arm link 50 moves control arm 48 downwardly from neutral position A to exhaust position range C, as shown in FIG. 15, thereby activating height control valve 200 and causing the height control valve to exhaust compressed air from front and rear air springs 24F,R, through third air spring conduit 222 and second air spring conduit 218 via exhaust conduit 46, and in turn returning beam 18 to the design ride height.

With continuing reference to FIG. 14, a key feature of second embodiment height control valve 200 of the present invention will now be described. When the operator of the vehicle desires to raise the ride height of the vehicle in order to provide greater ground clearance over high sections of the road surface, such as railroad tracks and off road conditions, the operator actuates a switch (not shown) which is electrically connected to solenoid valve 62, which in turn energizes the solenoid valve into its energized state 62E. In this state, air is routed from air reservoir 66, through air reservoir conduit 38, through first air spring conduit 202, through pilot valve 208, through the solenoid valve, through third air spring conduit 222, and into front and rear air springs 24F,R, thereby raising the vehicle ride height. As the vehicle raises, axle suspension system 10 articulates to an air spring extended position and the distance between vehicle frame 12 and beam 18 increases, extending front and rear air springs 24F,R. Since height control valve 200 is connected to hanger 16, which is rigidly connected to vehicle frame 12, the height control valve remains a generally constant distance from the vehicle frame.

When the distance between vehicle frame 12 and beam 18 increases, control arm link 50 moves control arm 48 downwardly from neutral position A to exhaust position range C, as shown in FIG. 15. However, because solenoid valve 62 is still energized, air is prohibited from flowing from front and rear air springs 24F,R through third air spring conduit 222, through the solenoid valve, through second air spring conduit 218, into height control valve 200, and out of exhaust conduit 46, air instead continues to flow from air reservoir 66 through air reservoir conduit 38 through first air spring conduit 202, through solenoid valve 62, through third air spring conduit 222, and into front and rear air springs 24F,R. Therefore, the vehicle ride height will continue to rise until height control valve 200 reaches the secondary ride height level D', shown in FIG. 15.

Once control arm 48 is lowered sufficiently to reach secondary ride height level D' (FIG. 15), air in pilot-air spring conduit 210 and connector conduit 212 is directed by height control valve 200 through pilot port 134, through pilot opening 132, through exhaust port 130 and out exhaust conduit 46 to atmosphere. Once in an unpiloted state 208U, pilot valve 208 prohibits further air flow from air reservoir 66 through air reservoir conduit 38, and through first air spring conduit 202, thereby prohibiting any further increase in the vehicle ride height. This is important because it allows multi-stage height control valve 200 to control the inflation of front and rear air springs 24F,R, avoiding over-inflation of the air springs which can potentially lead to premature failure of the shocks, shock brackets, and/or the air springs.

When the operator of the vehicle actuates the switch (not shown) to de-energize solenoid valve 62, in order to lower the vehicle to the primary design ride height, the solenoid valve is in de-energized state 62D which prohibits air flow from first air spring conduit 202, through the solenoid valve to third air spring conduit 222 and allows air flow through second air spring conduit 218 through the solenoid valve to the third air spring conduit. When this occurs, air is once again directed from front and rear air springs 24F,R, through third air spring conduit 222, through solenoid valve 62, through second air spring conduit 218, through second end 216 of pilot-air spring conduit 210, through connector conduit 212 to pilot valve 208 into piloted state 208P and also into height control valve 200, which then directs the air out through exhaust port 130 and out of exhaust conduit 46 to atmosphere, thereby lowering the vehicle to the primary design ride height.

Figure 16:
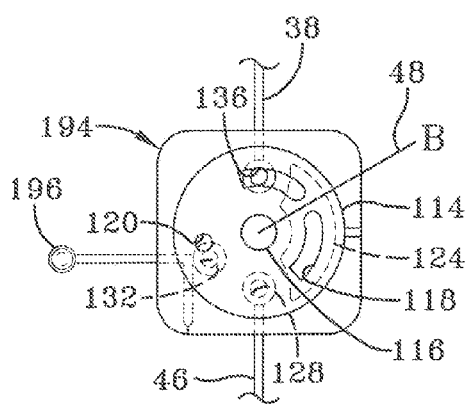
FIG. 16 is a view similar to FIG. 8, but showing the relative positions of the various rotor valve openings when the control arm is in the fill position range and also showing the visual warning light.
Figure 17:
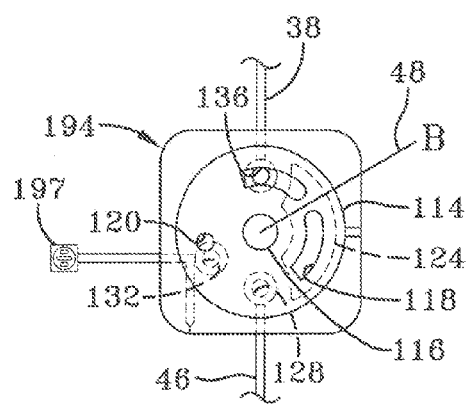
FIG. 17 is a view similar to FIG. 8, but showing the relative positions of the various rotor valve openings when the control arm is in the fill position range and also showing the audible alarm.

As set forth above, first and second embodiment multi-stage height control valves 100,200 of the present invention are designed for use with pneumatic control systems 195,250, respectively, as described above. However, additional uses of multi-stage height control valves 100,200 will be apparent to those having skill in the relevant art. For example, multi-stage height control valves 100,200 could be utilized in conjunction with a visual warning light 196 or an audible alarm 197 in place of integrated proportioning valve 166 such that secondary ride height pilot port 134 activates warning light 196 or alarm 197 when air is routed through the height control valve to the secondary ride height pilot port, as shown in FIGS. 16 and 17. Such a configuration would warn the driver of the vehicle that the secondary ride height has been achieved. Moreover, the location of pilot rotor opening 120 on valve rotor 114 could be moved and/or adjusted so that the secondary ride height pilot is associated with any number of particular ride heights, depending on the requirements necessary for the application. In addition, the shape of rotor opening 120 could be modified and or formed using different shapes, such as a slot, an elliptical-shaped opening or even a triangle-shaped opening without changing the overall concept or operation of the invention. It should also be understood that additional pneumatic and/or electronic components (not shown) that are known and used in the art, such as electronic controllers, valves, vents, and pneumatic lines, may be used in conjunction with height control valves 100,200, without affecting the overall concept or operation of the invention. Furthermore, rotor valve portion 194 of multi-stage height control valves 100,200 have been described as rotor-type valves, however, other types of valves or control means such as poppet valves or spool valves could be used without affecting the overall concept or operation of the invention. In addition, multi-stage height control valve 100 could be utilized including only rotor valve portion 194 without boost valve 146, without affecting the overall concept of the invention.

The present invention has been described with reference to a specific embodiment. It is to be understood that this illustration is by way of example and not by way of limitation. Potential modifications and alterations will occur to others upon a reading and understanding of this disclosure, and it is understood that the invention includes all such modifications and alterations and equivalents thereof.

Accordingly, the multi-stage height control valve of the present invention is simplified, provides an effective, safe, inexpensive, and efficient multi-stage height control valve which achieves all the enumerated objectives, provides for eliminating difficulties encountered with prior art height control valves, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the multi-stage height control valve is constructed, arranged and used, the characteristics of the construction and arrangement, and the advantageous, new and useful results obtained: the new and useful structures, devices, elements, arrangements, parts and combinations, and methods are set forth in the appended claims.

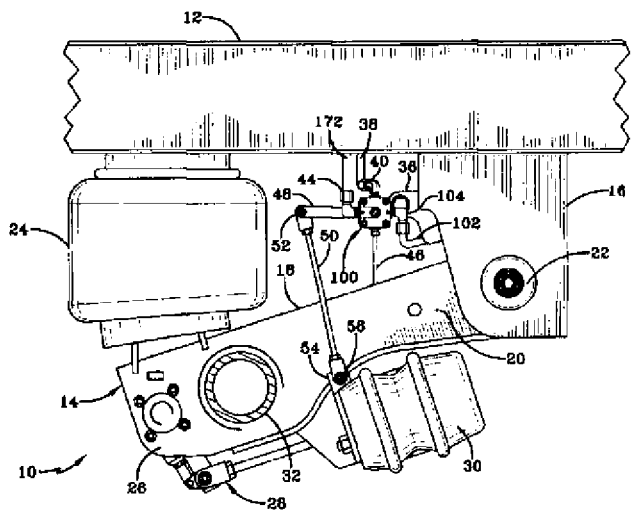

What is claimed is:

1. A multi-stage height control valve for a pneumatic control system of a vehicle, said height control valve being mounted on said vehicle and comprising:
   a) an air reservoir port being in fluid communication with a compressed air source;
   b) an air spring port being in fluid communication with at least one air spring of said vehicle;
   c) an exhaust port being in fluid communication with atmosphere;
   d) a pilot port being in fluid communication with a control/warning device and with a selected one or more of said air reservoir port, said air spring port or said exhaust port; and
   e) a flow control means being in fluid communication with said air reservoir port, said air spring port, said exhaust port and said pilot port, said flow control means being operatively attached to said vehicle for regulating fluid flow through said air reservoir port, said air spring port, said exhaust port, and said pilot port during operation of said vehicle, whereby said height control valve provides a signal via said pilot port when a secondary ride height has been reached.

2. The multi-stage height control valve of claim 1, wherein said compressed air source further comprises an air tank.

3. The multi-stage height control valve of claim 1, wherein said flow control means further comprises a rotor valve including a handle, said handle being operatively connected to said vehicle, whereby movement of said handle regulates fluid flow through said reservoir port, said air spring port, said exhaust port, and said pilot port.

4. The multi-stage height control valve of claim 1, wherein said control/warning device is a pilot valve, said pilot valve being in fluid communication with said at least one air spring and said compressed air source.

5. The multi-stage height control valve of claim 1, wherein said flow control means further comprises a spool valve including a handle, said handle being operatively connected to said vehicle, whereby movement of said handle regulates fluid flow between said reservoir port, said air spring port, said exhaust port and said pilot port.

6. The multi-stage height control valve of claim 1, further comprising a pilot boost valve, said pilot boost valve being in fluid communication with said pilot port and said compressed air source.

7. The multi-stage height control valve of claim 6, said pilot boost valve further comprising a two position, 3-way pilot valve being in fluid communication with said pilot port, said compressed air source, and said control/warning device.

8. The multi-stage height control valve of claim 7, wherein said pilot boost valve further comprises a bleed conduit.

9. The multi-stage height control valve of claim 1, said control/warning device is selected from the group consisting of a warning light and a warning buzzer.

10. The multi-stage height control valve of claim 1, wherein said flow control means further comprises a poppet valve including a handle, said handle being operatively connected to said vehicle, whereby movement of said handle regulates fluid flow between said reservoir port, said air spring port, said exhaust port and said pilot port.

11. A multi-stage height control valve for a pneumatic control system of a vehicle, said height control valve being mounted on said vehicle and comprising:
    a) an air reservoir port being in fluid communication with a compressed air source;
    b) an air spring port being in fluid communication with at least one air spring of said vehicle;
    c) an exhaust port being in fluid communication with atmosphere;
    d) a pilot port being in fluid communication with control/warning device;
    e) a pilot boost valve, said pilot boost valve being in fluid communication with said pilot port and said compressed air source; and
    f) a flow control means being in fluid communication with said air reservoir port, said air spring port, said exhaust port and said pilot port, said flow control means being operatively attached to said vehicle for regulating fluid flow through said air reservoir port, said air spring port, said exhaust port, and said pilot port during operation of said vehicle, whereby said height control valve alternatively prevents or signals excessive dumping or overinflation of said at least one air spring when a secondary ride height has been reached.

12. A multi-stage height control valve for a pneumatic control system of a vehicle, said height control valve being mounted on said vehicle and comprising:
    a) an air reservoir port being in fluid communication with a compressed air source;
    b) an air spring port being in fluid communication with at least one air spring of said vehicle;
    c) an exhaust port being in fluid communication with atmosphere;
    d) a pilot port being in fluid communication with a control/warning device;
    e) a pilot boost valve, said pilot boost valve comprising a two position, 3-way pilot valve being in fluid communication with said pilot port, said compressed air source, and said control/warning device; and
    f) a flow control means being in fluid communication with said air reservoir port, said air spring port, said exhaust port and said pilot port, said flow control means being operatively attached to said vehicle for regulating fluid flow through said air reservoir port, said air spring port, said exhaust port, and said pilot port during operation of said vehicle, whereby said height control valve alternatively prevents or signals excessive dumping or overinflation of said at least one air spring when a secondary ride height has been reached.

13. A multi-stage height control valve for a pneumatic control system of a vehicle, said height control valve being mounted on said vehicle and comprising:
    a) an air reservoir port being in fluid communication with a compressed air source;
    b) an air spring port being in fluid communication with at least one air spring of said vehicle;
    c) an exhaust port being in fluid communication with atmosphere;
    d) a pilot port being in fluid communication with a control/warning device;
    e) a pilot boost valve, said pilot boost valve comprising a bleed conduit and a two position, 3-way pilot valve, said two-position, 3-way pilot valve being in fluid communication with said pilot port, said compressed air source, and said control/warning device; and
    f) a flow control means being in fluid communication with said air reservoir port, said air spring port, said exhaust port and said pilot port, said flow control means being operatively attached to said vehicle for regulating fluid flow through said air reservoir port, said air spring port, said exhaust port, and said pilot port during operation of said vehicle, whereby said height control valve alternatively prevents or signals excessive dumping or overinflation of said at least one air spring when a secondary ride height has been reached.

14. A multi-stage height control valve for a pneumatic control system of a vehicle, said height control valve being mounted on said vehicle and comprising:
    a) an air reservoir port being in fluid communication with a compressed air source;
    b) an air spring port being in fluid communication with at least one air spring of said vehicle;
    c) an exhaust port being in fluid communication with atmosphere;
    d) a pilot port being in fluid communication with a control/warning device, said control/warning device being selected from the group consisting of a warning light and a warning buzzer; and
    e) a flow control means being in fluid communication with said air reservoir port, said air spring port, said exhaust port and said pilot port, said flow control means being operatively attached to said vehicle for regulating fluid flow through said air reservoir port, said air spring port, said exhaust port, and said pilot port during operation of said vehicle, whereby said height control valve alternatively prevents or signals excessive dumping or overinflation of said at least one air spring when a secondary ride height has been reached.

\* \* \* \* \*

UNITED STATES PATENT AND TRADEMARK OFFICE
CERTIFICATE OF CORRECTION

| | | |
|---|---|---|
| PATENT NO. | : 8,047,551 B2 | Page 1 of 1 |
| APPLICATION NO. | : 12/365244 | |
| DATED | : November 1, 2011 | |
| INVENTOR(S) | : Brian R. Morris and Jesse W. Cervantez | |

It is certified that error appears in the above-identified patent and that said Letters Patent is hereby corrected as shown below:

Col. 21, line 41, claim 11, add --a-- after "with" and before "control/warning".

at column 22, line 63, add the following claims that were rejoined upon notice of allowance:

15. The multi-stage height control valve of claim 1, said control/warning device comprising a 2-way, 2 position pilot valve, said pilot valve in fluid communication with said compressed air source, said at least one air spring and said pilot port.

16. The multi-stage height control valve of claim 15, further comprising a check valve disposed between and in fluid communication with said at least one air spring and said pilot port.

Signed and Sealed this
Twenty-first Day of February, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,047,551 B2 | |
| APPLICATION NO. | : 12/365244 | |
| DATED | : November 1, 2011 | |
| INVENTOR(S) | : Brian R. Morris and Jesse W. Cervantez | |

It is certified that error appears in the above-identified patent and that said Letters Patent is hereby corrected as shown below:

Delete the title page and substitute therefor the attached title page showing the corrected number of claims in patent.

Col. 21, line 41, claim 11, add --a-- after "with" and before "control/warning".

At column 22, line 63, add the following claims that were rejoined upon notice of allowance:

15. The multi-stage height control valve of claim 1, said control/warning device comprising a 2-way, 2 position pilot valve, said pilot valve in fluid communication with said compressed air source, said at least one air spring and said pilot port.

16. The multi-stage height control valve of claim 15, further comprising a check valve disposed between and in fluid communication with said at least one air spring and said pilot port.

This certificate supersedes the Certificate of Correction issued February 21, 2012.

Signed and Sealed this
Twentieth Day of March, 2012

David J. Kappos
*Director of the United States Patent and Trademark Office*

(12) United States Patent
Morris et al.

(10) Patent No.: US 8,047,551 B2
(45) Date of Patent: Nov. 1, 2011

(54) MULTI-STAGE HEIGHT CONTROL VALVE INCLUDING POSITION SENSITIVE PILOT SIGNAL AND PRESSURE BOOST FOR VEHICLE AIR SPRINGS

(75) Inventors: Brian R. Morris, Uniontown, OH (US); Jesse W. Cervantez, Navarre, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 103 days.

(21) Appl. No.: 12/365,244

(22) Filed: Feb. 4, 2009

(65) Prior Publication Data
US 2009/0194179 A1    Aug. 6, 2009

Related U.S. Application Data

(60) Provisional application No. 61/025,930, filed on Feb. 4, 2008.

(51) Int. Cl.
  *B60G 17/00* (2006.01)
  *B60G 11/27* (2006.01)
  *F16F 9/43* (2006.01)

(52) U.S. Cl. ............ 280/5.514; 280/6.159; 280/124.16; 267/64.28; 137/625.21

(58) Field of Classification Search ............ 280/5.514, 280/6.157, 6.159, 6.15, 124.16; 267/64.16, 267/64.17, 64.28, DIG. 1, DIG. 2; 137/625.21, 137/625.23
See application file for complete search history.

(56) References Cited

U.S. PATENT DOCUMENTS

| | | | |
|---|---|---|---|
| 2,970,614 A * | 2/1961 | Christensen | 137/627.5 |
| 3,006,657 A * | 10/1961 | Augustin | 280/6.159 |
| 3,145,032 A * | 8/1964 | Turek | 280/124.157 |
| 4,033,608 A * | 7/1977 | Sweet et al. | 280/5.515 |
| 4,641,843 A * | 2/1987 | Morrisroe, Jr. | 280/5.514 |
| 4,673,172 A | 6/1987 | Blanz | |
| 5,560,591 A | 10/1996 | Trudeau | |
| 5,630,625 A | 5/1997 | Shaw | |
| 5,651,555 A | 7/1997 | O'Reilly | |
| 5,934,320 A * | 8/1999 | O'Reilly et al. | 137/625.21 |
| 6,089,551 A | 7/2000 | Haviland | |

(Continued)

FOREIGN PATENT DOCUMENTS

DE    2318535 A1    10/1974

(Continued)

*Primary Examiner* — Ruth Ilan
*Assistant Examiner* — Keith Frisby
(74) *Attorney, Agent, or Firm* — Krugliak, Wilkins, Griffiths & Dougherty Co., L.P.A.; David P. Dureska; Brent L. Moore

(57) ABSTRACT

A multi-stage height control valve for a pneumatic control system of a vehicle includes an air reservoir port, an exhaust port, an air spring port and a pilot port operatively connected to a rotor valve which is in turn operatively connected to the vehicle. The air reservoir port fluidly communicates with an air tank. The air spring port fluidly communicates with the air springs of the vehicle. The exhaust port opens to atmosphere. The pilot port fluidly communicates with a control/warning device such that, when a secondary ride height is reached by the vehicle, the pilot port signals the control/warning device in order to maintain the vehicle at the secondary ride height. The pilot port alternatively provides an air pressure boost in order to quickly re-inflate the air springs of the vehicle to return the vehicle to the primary design ride height.

16 Claims, 10 Drawing Sheets